US012698541B2

(12) United States Patent　(10) Patent No.:　US 12,698,541 B2
Kupisiewicz et al.　(45) Date of Patent:　Aug. 4, 2026

(54) VOLUME HEAT TREATMENT METHOD AND RELATED SYSTEM

(71) Applicant: LASER ENGINEERING APPLICATIONS, Seraing (BE)

(72) Inventors: Axel Stefan M Kupisiewicz, Neupré (BE); Jose Antonio Ramos De Campos, Seraing (BE); David Bruneel, Sougné-Remouchamps (BE); Anne Henrottin, Lierneux (BE); Liliana Cangueiro, Leuven (BE); Marc Decultot, Liège (BE); Paul-Etienne Martin, Bordeaux (FR)

(73) Assignee: LASER ENGINEERING APPLICATIONS, Seraing (BE)

( * ) Notice: Subject to any disclaimer, the term of this patent is extended or adjusted under 35 U.S.C. 154(b) by 821 days.

(21) Appl. No.: 17/794,483

(22) PCT Filed: Jan. 22, 2021

(86) PCT No.: PCT/EP2021/051442
§ 371 (c)(1),
(2) Date: Jul. 21, 2022

(87) PCT Pub. No.: WO2021/148600
PCT Pub. Date: Jul. 29, 2021

(65) Prior Publication Data
US 2023/0078751 A1　　Mar. 16, 2023

(30) Foreign Application Priority Data
Jan. 22, 2020　(BE) .................................. 2020/5041

(51) Int. Cl.
*C21D 1/09*　　(2006.01)
*B23K 26/082*　　(2014.01)
(Continued)

(52) U.S. Cl.
CPC .............. *C21D 1/09* (2013.01); *B23K 26/082* (2015.10); *C21D 1/38* (2013.01); *C21D 1/62* (2013.01);
(Continued)

(58) Field of Classification Search
CPC ... C21D 1/09; C21D 1/38; C21D 1/62; C21D 1/773; C21D 9/0025; C21D 1/34;
(Continued)

(56) References Cited

U.S. PATENT DOCUMENTS 4,797,532 A　1/1989　Maiorov
2007/0017607 A1　1/2007　Czerner et al.
(Continued)

FOREIGN PATENT DOCUMENTS

EP　　1308525 A2　5/2003
EP　　2402466 A1　1/2012
(Continued)

OTHER PUBLICATIONS

Shuja et al, "Laser heating of semi-infinite solid with consecutive pulses: Influence of materaial properties on temperature field", Optics and Laser Technology, Elsevier Science Publishers BV., Amsterdam, NL, vol. 40, No. 3, Oct. 29, 2007 (Oct. 29, 2007), p. 472-480, XP022319023.
(Continued)

*Primary Examiner* — Rebecca Janssen
(74) *Attorney, Agent, or Firm* — Dickinson Wright PLLC

(57) ABSTRACT

A method for volume heat treating a part having an external surface delimiting its volume is disclosed. The method includes providing a laser source, providing the part, and providing a support mechanism for supporting the part. The method further includes placing the part so that it is held in position by the support mechanism. The method further includes irradiating, with the laser source, at least one
(Continued)

segment of an external surface of the part with a laser exposure power and duration to obtain a temperature rise in essentially the entire volume of the part.

18 Claims, 7 Drawing Sheets

(51) Int. Cl.

| | | |
|---|---|---|
| *C21D 1/38* | (2006.01) |
| *C21D 1/62* | (2006.01) |
| *C21D 1/773* | (2006.01) |
| *C21D 9/00* | (2006.01) |
| *F27D 7/06* | (2006.01) |

(52) U.S. Cl.
CPC ........... *C21D 1/773* (2013.01); *C21D 9/0025* (2013.01); *F27D 7/06* (2013.01); *F27D 2007/066* (2013.01)

(58) Field of Classification Search
CPC ... B23K 26/082; F27D 7/06; F27D 2007/066; Y02P 10/25
See application file for complete search history.

(56) References Cited

U.S. PATENT DOCUMENTS

| | | | | |
|---|---|---|---|---|
| 2016/0076115 A1* | 3/2016 | Zeng | ........................ | C21D 1/70 |
| | | | | 266/249 |
| 2017/0252972 A1* | 9/2017 | Heimerdinger | ........ | B33Y 40/00 |
| 2018/0363079 A1* | 12/2018 | Wilden | .................... | C21D 9/48 |

FOREIGN PATENT DOCUMENTS

| | | |
|---|---|---|
| JP | 62116717 | 5/1987 |
| JP | H11241121 A | 9/1999 |
| JP | 2007231323 | 9/2007 |
| JP | 2007537877 | 12/2007 |
| JP | 2012252790 | 12/2012 |
| JP | 2015063715 A | 4/2015 |

OTHER PUBLICATIONS

International Search Report and Written Opinion with English Translation of the International Search Report for PCT Application No. PCT/EP2021/051442, dated Mar. 23, 2021, 12 pages.
JP Office Action dated Sep. 2, 2025 for JP Application No. 2022-543644, 4 pages.

* cited by examiner

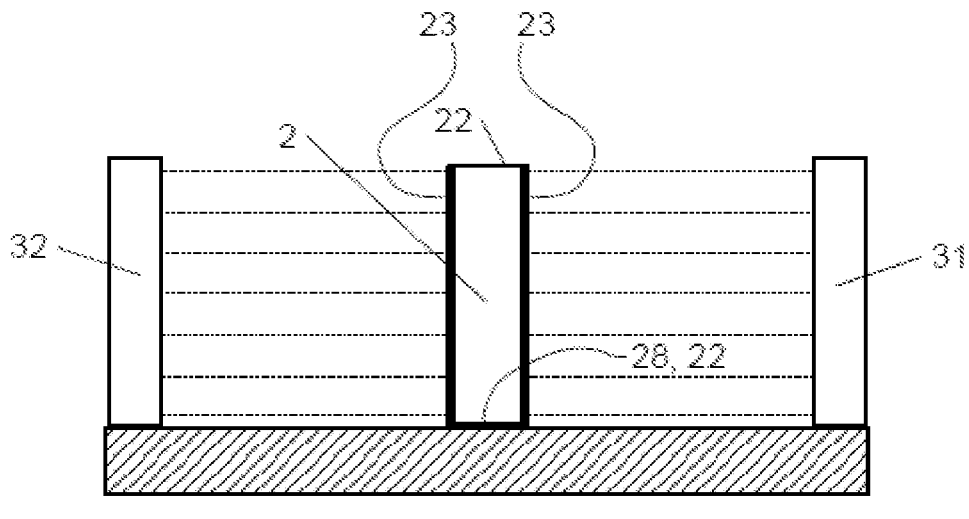
*Fig.2*
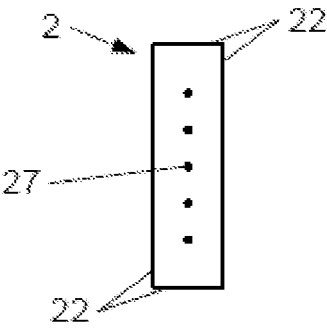
*Fig.3a*
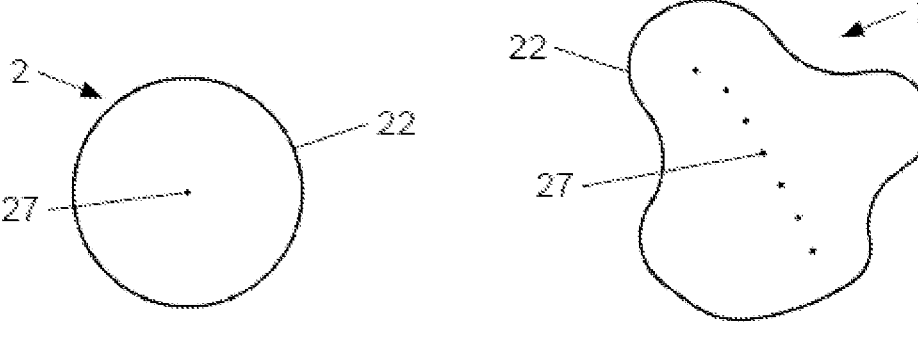
*Fig.3b*            *Fig.3c*

Temperature point
91, 92, 93, 94, 95, 96 (°C)

Temperature point 91 (°C)
Temperature point 92 (°C)
Temperature point 93 (°C)
Temperature point 94 (°C)
Temperature point 95 (°C)
Temperature point 96 (°C)

VOLUME HEAT TREATMENT METHOD AND RELATED SYSTEM

CROSS-REFERENCE TO RELATED APPLICATION(S)

This present application is a national stage application of International Patent Application No. PCT/EP2021/051442, filed Jan. 22, 2021, which claims priority to Belgium Patent Application No. 2020/5041, filed Jan. 22, 2020, the disclosures of which are hereby incorporated by reference in their entireties.

TECHNICAL FIELD

According to a first aspect, the invention relates to a volume heat treatment method. According to a second aspect, the invention relates to a system for the volume heat treatment of parts.

PRIOR ART

The volume heat treatment (quenching, tempering, annealing) is a metallurgical operation that is known to a person skilled in the art. A volume heat treatment consists of heating a part to a heating temperature and then cooling it at a predefined rate to maintain, for example at room temperature, the metallurgical structure of the part obtained at the heating temperature. In a volume heat treatment, essentially the entire volume of the part and preferably the entire volume of the part undergoes such a heat treatment. The mechanical properties of a part that has undergone such a volume heat treatment are generally much better for a specific application than those of a part that has not undergone heat treatment (for example, when the heat treatment is a quenching, we generally speak of a part hardened thanks to the volume quenching). For example, it is often possible to achieve a significantly higher resistance to deformation through volume heat treatment. For aluminium alloys, a volume quenching heat treatment has the effect of reducing the hardness but improving the mechanical properties.

The volume heat treatment is typically accomplished by heating a part in an oven and holding it in the oven long enough to reach a predetermined temperature in essentially the entire part (or in essentially its entire volume) that allows to result in a change in the structure of the material making up the part or a release of constraints present in the part. Then, the latter is usually cooled, for example rapidly by exposing it to a liquid or gaseous fluid, often by immersing it in it. The fluids are for example water, oil or gas. The rapid cooling is often necessary in order to maintain the material at room temperature in the structure induced by the temperature rise. In addition, techniques are known for the local laser or induction heat treatment of metal parts with a thickness equal to or less than 1.2 mm, these parts having a general plate shape (resulting for example from rolling steps). The thickness laser or induction treatment of these parts is not a volume treatment because these techniques require a relative displacement of the heat source with respect to the parts to be heated, if one wishes to heat the whole of these parts. For each relative position between the heat source and the part to be treated, only a small section transverse to the length of the parts is subjected to heating. Since the treatment is only local, it is necessary to repeat the treatment operation along the entire length of the parts. Such a treatment is therefore not a volume treatment. On the other hand, such a heat treatment presents various disadvantages such as for example: necessity to provide a system allowing a relative movement between the part to be heated and the heat source, risk of non-homogeneous heating. In addition, the induction heat treatments are industrially effective for certain materials only, such as ferromagnetic materials.

SUMMARY OF THE INVENTION

According to a first aspect, one of the purposes of the present invention is to provide a method for volume heat treatment that is simpler to implement and faster to perform. For this purpose, the inventors propose a method for volume heat treating a part having an external surface delimiting its volume, the method comprising the following steps:

a. providing a laser source;
b. providing the part;
c. providing support means for supporting the part;
d. placing the part so that it is held in position by the support means;
e. irradiating with the laser source at least one segment of the external surface of the part with a laser exposure power and duration to obtain a temperature rise in essentially the entire volume of the part.

Preferably, the support means have a degree of heat insulation between them and the part. As will be explained later, the inventors suggest having such a large degree of heat insulation, so that heat (or thermal energy) generated by the laser source at the level of the external surface segment of the part being irradiated is more likely to diffuse into the material making up the part than into the support means.

The inventors observed, against all expectations, that it was possible to apply a heat treatment in volume to a part, to harden it for example, with the only use of a laser source. The method of the invention allows to carry out heat treatments without apparent deformation of the part. Preferably, said temperature rise is greater than 200° C., more preferably greater than 400° C., even more preferably greater than 700° C., and even more preferably greater than 850° C.

The method of the invention is particularly effective, because it allows the laser source to heat a part in volume without heating its external environment. Thus, when the cooling of the part is initiated, it is necessary to dissipate only the heat stored in the part. In particular, it is not necessary to evacuate a quantity of heat stored by the support means of the part, or by the walls of an oven. By using the laser source to heat the part, it is possible to heat only the part and not its direct external environment. This is possible in particular thanks to the high radiative power of the laser source compared to conventional heating techniques such as direct flame, radiant tube, or electrical resistances. An advantage of the invention over an induction heating technique is that it allows the heat treatment of non-ferromagnetic materials. Such an advantage is not achieved at the expense of the ease of control of the heat treatment parameters nor at the expense of the geometry of the parts that the method of the invention allows to be thermally treated. Preferably, the combination of the laser source for heating and the support means with a degree of heat insulation between them and the part allows the heat provided by the laser source to be confined to the part and structure modification temperatures to be achieved. This same combination of a laser source and support means with a degree of heat insulation between them and the part, allows, as soon as the laser beam from the source is extinguished, to initiate a sufficiently rapid cooling to freeze the material constituting the part in the structure obtained during the heating step (step e.). As soon as the part no longer receives energy from the laser source, the heat in the part is very quickly evacuated towards the environment outside the part, e.g. by radiation, convection, or any other means of heat exchange. For all these reasons, the method according to the invention can be described as more efficient compared to known volume heat treatment methods.

When the method of the invention is implemented, the heat supplied to the part generates very little heating of its direct external environment. This is due in particular, if necessary, to the support means which have a degree of heat insulation between them and the part, and to the fact that it is possible to confine a laser beam only to the part to be heated or to a portion of it. The absence of significant heating of the environment outside the part allows it to quickly absorb heat from the part since the thermal energy supplied by the laser source has to heat only the part and not its environment. Thus, the method of the invention, requiring only the heating of the part to be thermally treated, allows a considerable energy saving both for the temperature rise phase and for the cooling phase. The method of the invention is therefore particularly advantageous in comparison with the methods of the prior art when it is desired to reduce the energy consumption associated with the heat treatment of parts.

In step e. the exposure power of the laser is preferably chosen to be substantially equal to the thermal loss of the part at a given temperature. Thus, when a heat treatment temperature is reached, it is possible to maintain the part at a stable temperature for several seconds or even several minutes, and this easily because it is enough to choose an appropriate power of the laser source. The laser exposure power to maintain the part at a predetermined temperature will directly depend on the selected predetermined temperature. In a preferred embodiment of the invention, the laser power supplied in step e. is reduced in order to achieve temperature stabilization in essentially the entire volume of the part and to maintain this temperature for a predetermined duration at a temperature lower than the temperature reached in step e.; such a temperature is typically that of an isothermal stage. Such an isothermal stage is known to the person skilled in the art and is intended to adapt the heat treatment according to the desired metallurgical phases at the end of the heat treatment and the treated materials. The method and the system of the invention are particularly advantageous for implementing such an isothermal stage during a heat treatment; in particular, the invention allows for a rapid transition between the initial heat treatment temperature and the isothermal stage temperature. Preferably, the isothermal stage has an isothermal stage duration between 10 minutes and 5 hours, preferably between 30 minutes and 2 hours. For small volume parts as defined by a preferred embodiment of the invention, it could be envisaged to have an isothermal stage with a duration of less than 10 minutes.

In substantially the entire volume of the part means in at least 80% of the volume of the part, preferably in at least 90% of the volume of the part, more preferably in at least 95% of the volume of the part and even more preferably in at least 99% of the volume of the part. The part or sample has a certain volume which can be expressed in $mm^3$ and an external surface which can be expressed in $mm^2$. However, it is possible to use other units for the volume and the external surface.

In a non-limiting manner, the heat treatment method of the invention can be used for the following applications:

medical parts, in particular medical implants, e.g. dental implants, joint prosthesis, etc.;

parts of precision mechanics, or precision mechanisms;
    security parts;
    parts comprising a shape memory material.

Another advantage of the method according to the invention is that it is very easy to implement, requiring only relatively simple control means. Indeed, the programming of the heat treatment according to the invention requires, in most cases, a control of the electrical power supplied to the laser source as a function of time by the control means. The control means allow the power of the laser source to be adapted to the physical and geometric characteristics of the part to be thermally treated and to the desired heat treatment (slope, stage, etc.). Thus, the control means define a laser power to be delivered as a function of time in order to thermally treat the part according to the slopes and stages corresponding to the heat treatment programmed by the operator. Thus, with the method of the invention, it is possible to realize heat treatments for a large number of different materials, for parts with different geometries and over wide temperature ranges with a same heat treatment system. The means of control are therefore extremely simple and the power to be delivered to the laser is low compared to the powers to be delivered for other types of electric heating means.

Preferably, the method further comprising, after the step e., the following step:

f. stopping the irradiation of the step e. to cool the part.

In this preferred embodiment, a step is added to allow the cooling of the part after it is heated by the laser source. Compared to known heat treatments where there is also a cooling phase, this preferred embodiment is simpler. Indeed, this method does not require any displacement or handling of the sample (or part) between the temperature rise step and the cooling step. In particular, the cooling step f. does not require immersing the part in a liquid. For this reason also the method according to the invention is simpler. The absence of these manipulations also allows for a volume heat treatment method with a faster cooling phase. The cooling rates known from the prior art vary between 1° and 100° C./s. The method and the system of the invention allow cooling rates of more than 100° C./s, preferably more than 150° C./s, to be achieved in the step f.

A heat treatment method is volume quenching, which consists of heating a part to a heating temperature and then cooling it at a sufficiently high rate to maintain, for example at room temperature, the metallurgical structure of the part obtained at the heating temperature. In volume quenching, essentially the entire volume of the part, and preferably the entire volume of the part, undergoes such a heat treatment. The mechanical properties of a part that has undergone such a volume quenching method are generally much better than those of a non-quenched part (we generally speak of a part hardened thanks to volume quenching, but for certain materials such as aluminium alloys, the quenching operation can have the effect of reducing the hardness but nevertheless improving its mechanical properties). As an example, it is often possible to achieve a significantly higher deformation resistance and/or wear resistance by volume quenching.

The volume quenching is typically realized by heating the part in an oven and holding it long enough to reach a predetermined temperature in essentially the entire part (or essentially its entire volume), thereby allowing to achieve a structural change in the material making up the part. Then, the latter is cooled rapidly by exposing it to a liquid or gaseous fluid, often by immersing it in it. The fluids are for example water, oil or gas. The rapid cooling allows the material to freeze in the structure induced by the temperature rise.

Preferably, one purpose of the present invention is to propose a volume quenching method that is easier to implement and faster to realize. The quenching is a term known to a person skilled in the art. Preferably, the method of the invention is a method of volume quenching of the part, the step e. allows to induce a structural change in the material constituting the part, and, the step f. is adapted to freeze the material constituting the part in a structure different from the one it had before the irradiation in the step e.

For example, the change in the structure of the material constituting the part is a phase change, or a change in the metallurgical structure. This is known to a person skilled in the art. A phase change is an allotropic transformation. For example, a phase change can occur when a phase change line in a phase diagram of the material forming the part is crossed during the temperature rise of the part induced by the irradiation by the laser source. Preferably, during the quenching, the material is frozen in the structure obtained in the step e. For this, the cooling in the step f. should be in general quite fast, although this will depend on the type of material.

The volume quenching method proposed by the inventors is quite surprising. They observed, against all odds, that it was possible to apply a volume quenching to a part to harden it with the sole use of a laser source. The method of the invention allows to realize the quenching without apparent deformation of the part. The inventors have found that the lack of apparent deformation of the part is due to the fact that the quenching method allows the entire volume of the part to be treated in a very short time.

The method of the invention allows for the volume quenching of a part in a simple manner because the method does not require any displacement or manipulation of the sample between the temperature rise step and the cooling step. The cooling step f. freezes the material forming the part in a new structure, e.g. the one obtained during the heating (step e.), without the need to immerse the part in a liquid. For this reason also the method according to the invention is simpler. The absence of these manipulations also allows for a faster volume quenching method.

The method of the invention is particularly effective, because it allows the laser source to heat the part effectively without heating the environment outside the part. Thus, when the step f. is initiated so as to have a rapid cooling of the entire part, it is then necessary to dissipate only the heat stored in the part. In particular, it is not necessary to evacuate a quantity of heat stored by the support means of the part, or by the walls of an oven, or by the gaseous environment surrounding the part. By using the laser source to heat the part, it is possible to heat only the part and not its direct external environment. This is possible in particular thanks to the high radiative power of the laser source compared to conventional heating techniques such as direct flame, radiant tube, electric resistance or induction. Preferably, the combination of the laser source for heating and the support means with a degree of heat insulation between them and the part allows the heat provided by the laser source to be confined to the part and structure modification temperatures to be achieved. This same combination of a laser source and support means with a degree of heat insulation between them and the part, allows, as soon as the laser beam from the source is extinguished, to initiate a sufficiently rapid cooling to freeze the material constituting the part in a new structure, for example that obtained during the heating step (step e.).

As soon as the part no longer receives energy from the laser source, the heat in the part is very quickly evacuated towards the environment outside the part, e.g. by radiation, convection, or any other means of heat exchange. For all these reasons, the method according to the invention can be described as more efficient compared to the known volume quenching methods.

When the volume quenching method of the invention is implemented, the heat supplied to the part generates very little heating of its direct external environment. This is due in particular, if necessary, to the support means which have a degree of heat insulation between them and the part, and to the fact that it is possible to confine a laser beam only to the part to be heated or to a portion of it. The absence of significant heating of the environment outside the part then allows it to quickly dissipate heat from the part during the cooling step, the step f, which is important to have an efficient quenching method where the material making up the part is frozen in a given structure.

For example the part is made of steel, the quenching temperature of a steel part is very often between 700° C. and 950° C. For example, for an aluminium part, the quenching temperature is very often between 440° C. and 535° C. For example, for a titanium part, the quenching temperature is between 300° C. and 600° C.

In substantially the entire volume of the part means in at least 80% of the volume of the part, preferably in at least 90% of the volume of the part, more preferably in at least 95% of the volume of the part and even more preferably in at least 99% of the volume of the part. For example, the part comprises a material having a thermal conductivity greater than $15 \ \mathrm{W \cdot m^{-1 \cdot \circ} \ C.^{-1}}$., so that the part can preferably be affected by the heat treatment of the invention in 100% of its volume.

Preferably, the irradiation in the step e. is adapted to impose an essentially homogeneous temperature in essentially the entire volume of the part. The inventors have indeed found, with surprise, that it is possible to choose laser power and duration such as in the step e. allowing to obtain a substantially homogeneous temperature in the entire volume of a part, using a laser irradiation. This ultimately results in an efficient and good quality volume quenching method because the different regions of the volume of the part undergo essentially the same temperature increase in the step e.

An essentially homogeneous temperature means that the maximum relative temperature difference between two points of the volume of the part is at most 20%, preferably at most 10%, and even more preferably at most 1%.

Thus, for this embodiment, depending on a cross-section (transverse or longitudinal) of the part, it is irradiated in the step e. until an essentially flat or homogeneous temperature profile is obtained between the external surface and the core of the part. A longitudinal or transverse cross-section here means a section made parallel to the direction of the laser beam from the laser source.

Preferably, the laser source is configured to emit a collimated light beam, and irradiate in the step e. said at least one segment of the external surface of the part with the collimated light beam.

The use of a collimated laser beam for the irradiation of the part allows not to have to make adjustments with regard to a distance relative to the focusing or the divergence of the beam. Furthermore, the collimated laser beam allows the irradiation of a part in the step e. regardless of the profile of the external surface of the part (profile with several heights). Thus, the collimated laser beam allows to irradiate a segment of the external surface of the part having a non-planar profile in a more homogeneous way because the collimated laser beam allows to irradiate simultaneously with the most homogeneous power density possible, segments of parts having different heights. The use of a collimated laser beam therefore allows for a heat treatment that is adaptable to parts with more complex surface geometries compared to a heat treatment with a focused laser beam. In another embodiment of the invention, the laser beam is homogenized and then focused towards the part.

Preferably, the step f. further comprises an action of directing a fluid in the direction of the part to cool it by convection. Such an action is optional but allows to accelerate the cooling of the part by heat transfer by convection in particular. The fluid can be a gas or a liquid.

Preferably, the method further comprises an action of exposing the part to a treatment gas to modify its external surface. For example, the gas is nitrogen, so that during the heat treatment, a nitriding of the external surface of the part occurs.

Preferably, the support means have a flat support surface for supporting the part. This allows to increase the mechanical stability of the part, minimizing the high temperature constraints in the part to prevent material creep, when the latter has at least one segment of flat external surface.

Preferably, the support means comprise a refractory material. The inventors have observed that the method of the invention, and in particular the preferred embodiment corresponding to a volume quenching method, is all the more effective the greater the degree of heat insulation between the support means and the part. This allows to minimize any heat transfer from the part towards the support means, during the step e. and in fine to have a temperature rise with a great homogeneity in the volume of the part because the heat has more tendency to diffuse within the part itself rather than outside. In this context, the inventors propose to preferably use support means made of thermally insulating material and more preferably of refractory material, a term known to a person skilled in the art. The term refractory is known to a person skilled in the art.

Preferably, the support means comprise a material having a thermal conductivity less than 20 $W \cdot m^{-1 \cdot \circ} C.^{-1}$, more preferably less than 10 $W \cdot m^{-1 \cdot \circ} C.^{-1}$, even more preferably less than 5 $W \cdot m^{-1 \cdot \circ} C.^{-1}$. An equivalent unit to $W \cdot m^{-1} \cdot K^{-1}$ is the $W \cdot m^{-1 \cdot \circ} C.^{-1}$. The thermal conductivity is a term known to a person skilled in the art. The preferred values of thermal conductivity are given for a temperature of 25° C. With this preferred embodiment, it is possible to have a relatively high thermal conductivity of the part to be quenched compared to the thermal conductivity of the support means, for a wide range of possible materials of the part, in particular for a wide range of metals. This allows a high degree of homogeneity of the temperature rise in the entire volume of the part while heating the support means as little as possible. It should be noted that it is possible to envisage support means having a thermal conductivity of less than 20 $W \cdot m^{-1 \cdot \circ} C.^{-1}$, preferably less than 10 $W \cdot m^{-1 \cdot \circ} C.^{-1}$, even more preferably less than 5 $W \cdot m^{-1 \cdot \circ} C.^{-1}$, without necessarily using a refractory material for them. This constitutes another preferred embodiment of the method of the invention.

Preferably, there is a contact surface between the part and the support means, the contact surface having a surface area of less than 10% of the surface area of the external surface, more preferably less than 2%, even more preferably less than 1%. For a same thermal conductivity of the support means, a heat exchange between the part and the support means will be lower when the contact surface between the part and the support means is smaller.

Preferably, the heat treatment method of the invention is particularly well adapted to support means having a low thermal conductivity and a reduced contact surface between part and support means. Thus, it is particularly important to have a product (thermal conductivity of the support means)× (contact surface between part and support means) as small as possible.

Preferably, the part consists of a material having a thermal conductivity greater than 10 $W \cdot m^{-1 \cdot \circ} C.^{-1}$, more preferably greater than 35 $W \cdot m^{-1 \cdot \circ} C.^{-1}$ and even more preferably greater than 50 $W \cdot m^{-1 \cdot \circ} C.^{-1}$. As already suggested above, the inventors have observed that the method of the invention and in particular the preferred embodiment corresponding to a volume quenching method is all the more effective when the transfer of heat generated at the level of the external surface of the part is primarily within the volume of the part, rather than outwardly, such as towards the support means. This allows in fine to have a rise of temperature presenting a great homogeneity in the volume of the part because the heat has more tendency to diffuse within the part rather than outside. In this context, the inventors propose to preferably use a part made of a material with a sufficiently high thermal conductivity.

Preferably, the volume of the part is between 0.01 $mm^3$ and 5 $cm^3$, more preferably between 0.1 $mm^3$ and 500 $mm^3$, and even more preferably between 1 $mm^3$ and 100 $mm^3$. Surprisingly, the inventors have noticed that small volume parts, i.e. less than a $cm^3$ (and therefore also having a rather small mass), allow for a particularly efficient method according to the invention. This is also true for the preferred embodiment corresponding to a volume quenching method. This is quite surprising. A plausible explanation would be the following. When the part to be thermally treated (to be quenched) has a small volume, i.e. less than a $cm^3$ for example, there is little material allowing to evacuate the heat generated on the external surface and therefore the entire volume of the part tends to heat up very quickly. Thus, the mass of a part with a small volume is not sufficient to produce a high thermal gradient in the part as a result of the temperature rise at its external surface. The process is therefore different from a surface quenching where the volume of the part allows to absorb a surface heating without heating homogeneously and reaching a temperature close to that of the irradiated surface. For example, the volume of the part is less than 5 $cm^3$ for an aluminium or brass part. For example, the volume of the part is less than 2 $cm^3$ for a steel or titanium part. Examples of small part mass for the method of the invention are between 1 and 100 grams, preferably between 10 and 50 grams and even more preferably between 15 and 30 grams. It is also possible to provide parts with a mass of less than 1 gram, for example parts with a mass between 0.005 and 0.1 gram.

Preferably, the part has a specific surface between 0.01 $mm^{-1}$ and 150 $mm^{-1}$, more preferably between 0.1 $mm^{-1}$ and 100 $mm^{-1}$, even more preferably between 1 $mm^{-1}$ and 10 $mm^{-1}$. The specific surface area of a part is equal to the area of its external surface divided by the volume of the part. In order to obtain a near absence (absence) of metallurgical structure gradient in the thermally treated part and thus a volume homogeneity of the metallurgical structure of the part, for example during the step f. for the preferred embodiments comprising such a step, it is preferred to have parts that are not very compact, having a specific surface area at least 10 times greater than that of a sphere having the same volume. This allows the part to be cooled, for example in the step f. for preferred embodiments comprising such a step, more easily and quickly. Such constraints and thus such a preferred embodiment is particularly advantageous when the volume treatment method of the invention corresponds to a volume quenching method.

Preferably, said external surface consists of a first and a second external surface segments, and the step e. consists of irradiating only the first segment of the external surface with a laser power and an exposure duration to have a substantially equal temperature between the first and second segments of the external surface.

A substantially equal temperature between the first and second external surface segments of the part means that they have a temperature difference of less than 50° C., preferably less than 25° C., more preferably less than 10° C., most preferably less than 5° C., and most preferably less than 2° C. This preferred embodiment allows for a particularly easy to implement method because it requires irradiating only a segment of the external surface of the part. In particular, one can imagine irradiating the part only from one side.

Preferably, the external surface comprises a first and a second external surface segments, and the step e. consists of irradiating the first and second external surface segments.

According to this other possible embodiment, the inventors propose to irradiate at least two different segments of the external surface of the part. We can for example irradiate the part from two of its faces which are for example opposite: for example irradiate a right side and a left side of the part. This allows a temperature rise to be induced from two different ends of the part, which can be particularly useful for thicker parts.

Preferably, the step e. consists of irradiating at least one segment of the external surface of the part for an exposure duration of less than or equal to 10 s, more preferably less than or equal to 8 s, even more preferably less than or equal to 5 s. The inventors have found that particularly good results are achieved using such long laser exposure durations. In particular, such exposure durations allow for a temperature rise in essentially the entire volume of the irradiated part and in many cases, for a homogeneous temperature rise in the entire volume of the part.

Preferably, the laser source is a continuous laser source or a laser source with pulses of durations greater than 1 ms or with pulse of durations between 20 and 30 ms. The inventors have found that it is possible to get very good results using continuous laser sources that are inexpensive. Good results are also obtained with laser sources with relatively long pulses, i.e. greater than 1 ms. The continuous laser sources or sources with such pulse durations are not only inexpensive, but also very common and easy to implement in the scope of the method of the invention. Such laser sources are available in a wide range of wavelengths. This can be useful in order to have a wavelength adapted to the material constituting the part and thus maximize the absorption of the radiation by the part and its conversion into heat for the rise of the temperature of this one. According to a preferred embodiment, the polarization of the radiation can be adjusted to maximize the absorption of the radiation by the part. For example, the polarization of the laser beam on the part can be linear s or p, elliptical or circular. When heat treating parts with curved external surfaces or with different slopes, the reflection coefficients may change depending on the angle of incidence of the laser beam (angle between the direction of propagation of the laser beam and the normal to the surface at the point of irradiation). In order to maximize the absorption of the laser beam by the part to be thermally treated, preferably when the laser beam has an angle of incidence with a segment of the part greater than 10°, it may be interesting to modify the polarization of the laser beam to a linear polarization, preferably a polarization p, so as to obtain a better absorption by the part on its entire irradiated surface. In the case of curved parts or with different slopes, the use of a specific linear polarization (preferably p) can lead to a better homogeneity of absorption of the laser beam by the irradiated segment of the external surface.

Preferably, the step e. consists of irradiating at least one segment of the external surface of the part with a laser beam having a power of less than 100 W, more preferably less than 50 W, even more preferably less than 10 W. The inventors have found that it is possible to obtain very good results, and in particular very good quenching results when the method of the invention is a volume quenching method, even with low-power laser sources. Thus, for some parts, it is possible to have temperature rises of 1400 K with continuous laser sources with a power lower than 10 W or 6 W for example. In such a case, the inventors observed that a natural cooling of the part at room temperature (about 20° C.), i.e. without forced cooling such as convection, took less than 35 s.

Preferably, the laser source is adapted to provide an intensity-modulated laser beam and the step e. consists of irradiating at least one segment of the external surface of the part with an irradiation power that decreases with time during the step e. With this preferred embodiment, it is possible to reduce the risk of, or even avoid, excessive overheating of any portion of the part, in particular an excessive overheating of the external surface segment irradiated by the laser source. Too much overheating is generally unacceptable and induces to a local or total melting of the part. With this preferred embodiment of the invention, this risk is reduced because the intensity of the laser beam is reduced during the heating step e.

Preferably, the laser source comprises:

a laser beam generator, beam control means configured to modulate the intensity profile of the laser beam emitted by the laser beam generator.

In this preferred embodiment, the laser beam generator is optically coupled to the laser beam control means. Preferably the laser beam control means are laser beam shaping means. The laser beam control means allow to shape the intensity profile of the laser beam which is determined according to a plane perpendicular to its propagation direction. The beam control means allow to obtain a beam with a more uniform intensity distribution and thus allow to irradiate a part with more homogeneity in terms of power density.

Preferably, the beam control means comprise:

an optical fibre comprising an input and an output, adapted to convey a laser beam emitted by the laser beam generator between the input and the output, more preferably the optical fibre is multimode;

a laser beam projection device configured to project an image of the laser beam onto the part at its exit from the optical fibre.

In this preferred embodiment, the laser beam generator is optically coupled to the input of the multimode optical fibre so that essentially the entire laser beam is conveyed by the multimode optical fibre to its output. When the laser beam generator is a multimode laser beam generator, the multimode laser beam conveyed by the multimode optical fibre is mixed as it travels through the multimode optical fibre, so as to illuminate the output face (the output) of the fibre with a homogeneous laser beam intensity. Preferably, a better mode mixing and thus a better beam intensity homogeneity on the output face is achieved when the multimode optical fibre is bent. For example, the multimode optical fibre is bent into an "8" shape. Preferably, the multimode optical fibre has a length greater than 2 m, and more preferably a length between 6 m and 10 m, for example 8 m, in order to allow a good mixing of the modes and thus a good intensity profile uniformity at the output of the multimode optical fibre.

The laser beam projection device allows to project the image of the output (of the output face) of the multimode optical fibre onto the part to be thermally treated. This embodiment of the laser source allows the intensity profile of the laser beam to be modified, so that at the input of the multimode optical fibre, the (multimode) laser beam has a substantially Gaussian intensity profile as emitted by the laser beam generator, and, at the output, the laser beam has a uniform intensity profile over substantially the entire output face that it illuminates. The laser beam projection device then allows to form an image of the output face of the multimode optical fibre illuminated with a uniform intensity onto the part to be thermally treated.

Preferably, the laser beam projection device is configured to project the image of the laser beam onto the part with a collimated laser beam.

Another advantage of this embodiment of the laser source is that it can irradiate the part with a collimated laser beam. This is all the more advantageous (as already described above) as it allows to simplify the method by not requiring an additional step of adjusting the distance of the part from the laser source. Moreover, such a collimated laser beam of uniform intensity allows to irradiate with more homogeneity in terms of power density parts with complex geometries characterised by high form factors, or having bent surfaces.

Preferably, the laser beam projection device is adapted to adjust a magnification between the predetermined multimode optical fibre section taken at the output and the image of the laser beam when projected onto the part.

In this preferred embodiment, the laser beam projection device preferably comprises a first and a second converging lens, so as to project the laser beam at the output of the multimode optical fibre (which is then divergent) into a laser beam image on the part to be thermally treated with a laser beam that is collimated. Preferably, the first and second lenses are relatively movable with respect to each other according to a translation parallel to an optical axis defined by a main propagation direction of the laser beam at the output of the multimode optical fibre. Preferably, the first lens is movable relative to the output of the multimode optical fibre to adjust the first lens to multimode optical fibre output distance. Preferably, an increase in the distance between the first and second lenses allows an increase in magnification. Thus the laser beam projection device allows the size of the laser beam to be adapted to the size of the part to be thermally treated. For example, the multimode optical fibre has a section of 400 μm and the image of the laser beam at its output projected on the part has a diameter of 6 mm. This preferred embodiment of the laser source of the invention allows to obtain an irradiation of the part with a uniform and dimensionally adjustable laser intensity. The uniform beam intensity on the part allows to realize a heat treatment with a high quality because the temperature increase of the part is then generated with a thermal gradient at the level of the surface of the part which is almost null or zero. While heating by a laser source of the prior art inevitably introduces a thermal gradient on the surface of the part due to the Gaussian intensity profile of such laser sources. Another advantage of the laser beam projection device is to allow a modulation of the diameter of the image of the laser beam at its output on the part without altering its uniformity in intensity.

Preferably, the beam control means comprise:
a meniscus lens configured to change the diameter of the laser beam emitted from the laser beam generator to a modified collimated laser beam. Preferably, the beam control means comprise a plurality of meniscus lenses aligned along their respective optical axes. For example, at least one face of each of the meniscus lenses is aspherical so as to limit the aberrations due to the use of meniscus lenses.

Preferably, the beam control means comprise:
an optical element having an aspheric optical surface or an optical surface adapted to induce a phase shift.

Preferably, the beam control means comprise:
a diffraction optical element.

Preferably, the laser source further comprises beam focusing means positioned between the beam control means and the part.

Preferably, the method of the invention is a quenching method followed by tempering and further it comprises the following additional steps after the step f.:
  i. irradiating with the laser source at least one segment of the external surface of the part with a tempering laser exposure power which is less than the laser exposure power used in the step e. for the quenching.

The tempering of the part is realized by holding the part at a tempering temperature (less the quenching temperature) for a predetermined duration. The part is then subjected to an appropriate cooling to room temperature. The tempering allows to reduce the effects of the quenching by making the part more ductile and tougher. Such a tempering can advantageously be realized after quenching without changing the position of the part, which greatly simplifies the implementation of the method and the system allowing for implementing such a tempering step. Preferably, a tempering temperature for a steel part is between 200° C. and 450° C. Preferably, the tempering temperature of an aluminium part is between 150° C. and 200° C., for example 170° C.

Preferably, the method of the invention is a quenching method preceded by an annealing and it further comprises the following additional steps before the step a.: g. irradiating with the laser source at least one segment of the external surface of the part with an annealing laser exposure power that is less than the laser exposure power used in the step e.; h. cooling the part after heating it to an annealing temperature in the previous step to a temperature less than 100° C., preferably to room temperature.

The annealing consists of heating the part to a predetermined temperature (referred to as annealing temperature), maintaining the part at this annealing temperature for a predetermined time, and then cooling the part at a predetermined cooling rate in order to obtain, after returning to room temperature, a structural state of the material constituting the part close to the stable equilibrium state. This operation aims at eliminating or reducing residual constraints linked for example to a previous heat treatment, or, to obtain the formation of a structure favourable to a later action without fracturing (deformation, machining, heat treatment, etc.). Such an annealing can advantageously be realized before the quenching without modifying the position of the part on the support means, which greatly simplifies the implementation of the method and of the system allowing to implement such an annealing step.

With the method of the invention, it is possible to provide the following three heat treatment phases with a same device, without having to modify the position of the part (and possibly in a very short time): annealing, then quenching, then tempering. In such a case, there is a first heating phase at a Tannealing temperature, held at Tannealing for a predetermined time, followed by a controlled cooling, then a second heating phase at a Tquenching temperature, held at Tquenching for a predetermined time, followed by a controlled cooling, Tquenching being greater than Tannealing, then a third heating phase at a Ttempering temperature, held at Ttempering for a predetermined time, followed by a controlled cooling, Tquenching being greater than Ttempering.

Preferably, the method of the invention further comprises the following additional steps:

j. providing a vacuum chamber and inserting the part inside the vacuum chamber;

k. realizing a partial vacuum in the vacuum chamber enclosing the part of less than 50,000 Pa, preferably less than 10,000 Pa and even more preferably less than 5,000 Pa.

The steps e. and/or f. and/or g. and/or h. can then be realized in a high or partial vacuum. The advantage is to be able to better control or even avoid any contamination of the material constituting the part.

Preferably, the method of the invention further comprises the following additional steps:

l. providing a heat exchanger;

m. bringing into contact the part with the heat exchanger during the step f.

Such a preferred embodiment allows for faster and more efficient cooling of the part.

Preferably, the method of the invention further comprises the following additional steps:

n. providing a liquid bath;

o. partially immersing the part in the liquid bath during the step f., more preferably, fully immersing the part.

Such a preferred embodiment allows for faster and more efficient cooling of the part.

Preferably, the material that at least partially constitutes the part is a metallic material. The method of the invention is indeed particularly suitable for this type of material (metals).

For example, the metallic material at least partially constituting the part is a carbon steel, preferably a steel comprising 1% carbon by weight. A carbon steel is a term known to a person skilled in the art. It generally refers to a steel whose main alloying component is carbon, in segments ranging from 0.02% to 2% by mass.

The inventors also propose a system for volume heat treatment of a part having an external surface delimiting its volume, the system comprising:

a laser source configured to irradiate at least one segment of the external surface of the part with a laser exposure power and duration to achieve a temperature rise in substantially the entire volume of the part to induce a structural in the material making up the part;

support means for supporting the part.

Preferably, the system of the invention is used for the volume quenching of a part. Preferably, the support means have a degree of heat insulation between them and the part.

The particular embodiments and associated advantages presented for the method of the invention apply to the system of the invention, mutatis mutandis.

Preferably, the laser source is a continuous laser source, or with pulses of duration greater than 1 ms, or with pulses of duration between 20 and 30 ms.

Preferably, the temperature rise is a temperature rise above 200° C., preferably above 400° C., more preferably above 700° C., even more preferably above 850° C.

Preferably, the temperature rise in essentially the entire volume of the part is a temperature rise in at least 80%, preferably at least 90%, more preferably 95%, even more preferably 99% of the volume of the part.

According to one possible embodiment, the support means have a support surface for contacting the part, the support surface having a surface area of less than 10% of the external surface of the part, preferably less than 5%, even more preferably less than 1% of the external surface of the part. With this preferred embodiment, the contact between the part to be quenched and the support means is reduced, decreasing the possibility of conductive heat transfer from the part towards the support means. This further increases the temperature within the part during the laser irradiation heating because the heat generated on the external surface segment of the part to be quenched has little alternative but to diffuse within the volume of the part. The heat transfer from the part towards the support means is further reduced by the fact that they comprise a refractory material. Preferably, the support means have a thermal conductivity of less than 20 $W \cdot m^{-1} \cdot {}^{\circ} C.^{-1}$ at 25° C.

According to another possible embodiment, the support means has a planar support surface for supporting the part. In such a case, it is possible to have a system where the part to be quenched remains in position easily. In this case, there is usually no need for means such as clamps to hold the part in position.

Preferably, the support means have a thermal conductivity less than 20 $W \cdot m^{-1} \cdot {}^{\circ} C.^{-1}$ more preferably less than 10 $W \cdot m^{-1} \cdot {}^{\circ} C.^{-1}$, even more preferably 5 $W \cdot m^{-1} \cdot {}^{\circ} C.^{-1}$.

Preferably, the part is made of a material with a thermal conductivity greater than 15 $W \cdot m^{-1} \cdot {}^{\circ} C.^{-1}$, more preferably greater than 35 $W \cdot m^{-1} \cdot {}^{\circ} C.^{-1}$ and even more preferably greater than 50 $W \cdot m^{-1} \cdot {}^{\circ} C.^{-1}$.

Preferably, the volume of the part is between 0.01 mm$^3$ and 1 cm$^3$, more preferably between 0.1 mm$^3$ and 500 mm$^3$, and even more preferably between 1 mm$^3$ and 100 mm$^3$.

Preferably, the laser source is configured to irradiate the external surface segment of a part with a laser beam having a power of less than 100 W, more preferably less than 50 W, even more preferably less than 10 W.

According to another possible embodiment, the system further comprises an optical fibre and is designed such that a laser beam from the laser source is adapted to reach by means of the optical fibre at least one external surface segment of a part supported by the support means. The use of the optical fibre allows to guide a laser beam from the laser source. This provides a greater flexibility to the system. In particular, it is possible to move the laser source away from the part to be quenched. For some applications, such a configuration may be preferred.

According to another preferred embodiment, the laser source comprises:

a laser beam generator, beam control means configured to modulate the intensity profile of the laser beam emitted by the laser beam generator.

Preferably, the beam control means comprise:

an optical fibre of predetermined cross-section comprising an input and an output, adapted to carrying a laser beam emitted by the laser beam generator between its input and its output, more preferably the optical fibre is multimode;

a laser beam projection device adapted to project onto the part an image of the laser beam at its exit from the optical fibre, more preferably the multimode optical fibre.

Preferably, the laser beam projection device is configured to project the image of the laser beam onto the part with a collimated laser beam.

Preferably, the laser beam projection device is adapted to adjust a magnification between the predetermined section of multimode optical fibre taken at the output and the image of the laser beam when projected onto said part.

Preferably, the beam control means comprise:

a meniscus lens configured to change the diameter of the laser beam emitted by the laser beam generator into a modified collimated laser beam.

Preferably, the beam control means comprise:

an optical element having an aspheric optical surface or an optical surface adapted to induce a phase shift.

Preferably, the beam control means comprise:

a diffraction optical element.

Preferably, the laser source further comprises beam focusing means positioned between the beam control means and the part.

According to another possible embodiment, the multimode optical fibre has a length between 1 m and 12 m, more preferably a length between 2 m and 8 m.

Preferably, the system further comprises a scanner for directing a laser beam from the laser source onto different parts to be volume quenched. This allows for an even more efficient heat treatment system and method because multiple parts can be treated easily and quickly. For example, it is possible to work in a tray, where different parts are supported on a tray and the laser beam is directed onto the different parts by the scanner.

Preferably, comprises the system further a temperature sensor, preferably a pyrometer, for measuring a temperature of the part. With this embodiment, it is possible to provide a control loop to adjust the power of the laser source according to the temperature measured by the temperature sensor. For example, a pyrometer which is an example of a temperature sensor measures the temperature of the segment of the external surface of the part that is irradiated by the laser source.

The inventors also propose an assembly comprising the system as described above with all its preferred embodiments and the part to be quenched.

The inventors propose the following theoretical explanation of the method and the system of the invention.

TEMPERATURE RISE/Laser Heat Input

Energy is provided to the part via a laser beam (L) with a specific fluence (flux=laser power (W)/irradiation surface (cm²)). Preferably, and as described above for some embodiments, multiple beams could strike the entire envelope (or external surface) of the part to further reduce the temperature gradient between the core of the part and the irradiated external surface segment. The laser of predetermined power P illuminates the external surface segment of the part with a diameter D for example for a laser spot with a circular cross-section.

Study of the Thermal Balance in the Irradiated Part

The transfer of heat between the part and its external environment is governed by three phenomena: the conduction, the convection and the radiation.

The physical properties to be considered are as follows:

The coefficient of thermal conductivity k (or heat conductivity) measures the propensity of a body to develop a heat flux when it undergoes a difference in T°;

the specific heat c (or thermal mass capacity) measures the rate of variation of the internal energy with the T°; this magnitude reflects the capacity of a material to accumulate energy in thermal form when its temperature increases;

the heat capacity C (or thermal capacity) measures the capacity of a medium to accumulate (or to restore) heat. Conversely, this magnitude measures the energy that must be transferred to it to increase its temperature by one Kelvin.

From these coefficients, it is possible to calculate for different materials of the part, the thermal diffusivity $\alpha=k/(\rho c)$ which measures the ease of propagation of the heat in the material of the part. The distances travelled by a thermal information after t seconds are proportional to the square root of $\alpha \cdot t$. In the equation $\alpha=k/(\rho c)$, p is the density (p ex in $g \cdot cm^{-3}$) and c is the specific heat (usually expressed in J $kg^{-1} K^{-1}$).

Examples of thermal diffusivity $\alpha$ for commonly used materials: $\alpha$ (steel)=4.30E-06 $m^{-2}$/s; $\alpha$ (aluminium)=9.79E-05 $m^{-2}$/s; $\alpha$ (brass)=3.79E-05 $m^{-2}$/s; $\alpha$ (titanium)=7.66E-06 $m^{-2}$/s.

Table 1 shows an estimate of thermal gradient in estimation of penetration depth for some known metals.

TABLE 1

| | | Estimation of thermal gradients | | | |
|---|---|---|---|---|---|
| | | Steel 4.30E-06 | Aluminium 9.79E-05 | Brass 3.79E-05 | Titanium 7.66E-06 |
| | $\alpha$ | mm | mm | mm | mm |
| Depth of thermal | after 1 s | 2.1 | 9.9 | 6.2 | 2.8 |
| penetration: | after 2 s | 2.9 | 14.0 | 8.7 | 3.9 |
| | after 3 s | 3.6 | 17.1 | 10.7 | 4.8 |
| | after 4 s | 4.1 | 19.8 | 12.3 | 5.5 |
| | after 5 s | 4.6 | 22.1 | 13.8 | 6.2 |

These estimations show for a same illumination power on the external surface, the distance to the illuminated external surface that reaches a temperature close to that of the external surface. The higher the thermal diffusion coefficient, the faster the heat is diffused into the core of the part. These estimations are intended to give orders of magnitude because the various coefficients used are taken under normal conditions (20° C.), but such coefficients vary with the temperature (for example, k decreases with the temperature for the steel while k increases with the temperature for some alloys and the brass).

It is possible to determine an order of magnitude of the time for the opposite surface of the part to be at the same temperature as the surface of the part illuminated by the laser beam (which allows to give an idea of the amplitude of the temperature gradient in the part/the thickness of the part). Such orders of magnitude are shown in Table 2.

TABLE 2

Propagation time of the heat from the irradiated
surface to the opposite surface

| | Steel | Aluminium | Brass | Titanium |
|---|---|---|---|---|
| Time to reach the opposite surface: | ms | ms | ms | ms |
| Case of a 1 mm sheet: | 233 | 10 | 26 | 131 |
| Case of a cylinder of 600 μm of cross-section: | 84 | 4 | 9 | 47 |
| Case of a 250 μm thick disc | 15 | 1 | 2 | 8 |
| Case of a 2 mm thick plate | 931 | 41 | 105 | 522 |
| Case of a 5 mm thick plate | 5.816 | 255 | 659 | 3.263 |

It is found that for parts with thicknesses of less than 2 mm for steel and titanium, 5 mm for brass and 10 mm for aluminium, the time for the heat to propagate from the irradiated surface to the opposite surface is less than 1 s. Such an approach allows to determine an order of magnitude of a maximum gradient between the irradiated surface and the opposite surface as shown in Table 3.

TABLE 3

Amplitude of the temperature gradient

| | | Steel DT (° C.) | Aluminium DT (° C.) | Brass DT (° C.) | Titanium DT (° C.) |
|---|---|---|---|---|---|
| Rise time: | 200° c./s | | | | |
| Case of a 1 mm sheet: | | 47 | 2 | 5 | 26 |
| Case of a cylinder of 500 μm of cross-section: | | 17 | 1 | 2 | 9 |
| Case of a 250 μm thick disc: | | 3 | 0 | 0 | 2 |
| Rise time: | 100° c./s | | | | |
| Case of a 2 mm thick plate | | 93 | 4 | 11 | 52 |
| Case of a 5 mm thick plate | | 582 | 26 | 66 | 326 |

Calculation of the Temperature Rise Time of the Part

The inventors have found that if the rise time is 200° C./s, part thicknesses of up to 1 mm provide acceptable temperature gradients in the part for most applications of the method of the invention and for most materials. On the other hand, acceptable temperature gradients for a part thickness of 5 mm require the use of materials with high thermal conductivity coefficients such as aluminium. Thus, the temperature rise rate of the part will be proportional to the amount of energy brought by the laser on the irradiated surface of the part per unit of time, i.e. the fluence of the laser beam multiplied by the irradiated surface.

For the temperature rise phases, the calculation of the amount of energy to be provided by the laser beam will depend on the thermal balance in the part. As a first approximation, the amount of absorbed heat, generated by the part as a result of a phase change, or even internal work, $Q_{gen}$, is neglected.

1. Energy Input by the Laser: $Q_{in}$.

It is assumed that the upper surface of the part is irradiated with one laser beam (no multi-beam) with a laser energy P:

$$Q_{in} = P \times (\text{irradiated surface area/beam surface area}) \times (1-R)$$

where R is the reflectivity of the material constituting the part, preferably constituting the external surface of the part.

2. Energy Loss:

2.a. By Conduction:

The part is in contact with the support means. In order to minimize the losses by conduction, it is assumed that the support means comprise very small and/or ceramic contact surfaces to minimize the extent of the transfer area and the interstitial conduction coefficient.

2.b. By Convection:

The convection during the rise phase can be minimized by:
a limitation to a natural convection (no external air flux)
the partial vacuum in a vacuum chamber (the partial vacuum being generated by a vacuum pump); such a partial vacuum, in addition to limiting the losses by convection also has the interest of slowing down very strongly an oxidation (see a decarbonization of the surface of the part at higher temperature).

2.c. By Radiation:

The radiation loss is maximized when implementing the method of the invention compared to the use of an oven since the external environment remains at a moderate temperature, generally at room temperature (between 15 and 25° C., preferably at 20° C.). The radiation loss varies with $T^4$, and should be taken into account at the end of the temperature rise phase of the part, when the difference between the temperature of the environment and that of the part is large (significant).

An estimation of the losses by conduction, convection and radiation show that these are very low compared to the energy input of the laser if the temperature rises of the part are of the order of 100 to 200° C./s.

An approximation that neglects such losses allows us to determine an order of magnitude for the laser power to be provided as a function of the target temperature, the material and the desired time to obtain this temperature.

Example 1

According to the invention, it is desired to heat a steel part, held by support means, to 820° C. in 4 s (starting from an ambient temperature of 20° C.), i.e. a temperature difference DT of 800° C. requiring a temperature rise time of 200° C./s. It is assumed that the part is a cylinder of 0.6 mm cross-section and 4 mm length:

for the first 400° C., the losses by convection will be about 2 to 10% of the heat input $Q_{in}$, the losses by radiation will be about 1 to 2% of the heat input $Q_{in}$;

for the last 400° C., the losses by convection will be about 4 to 20% of the heat input $Q_{in}$, the losses by radiation will be about 5 to 15% of the heat input $Q_{in}$.

If we neglect these losses (comprising the losses with the support means by providing for example a heat insulation between the support means and the part, or by assuming that the support means are totally thermally insulating), the amount of energy to be brought $Q_a$ to the part will then be:

$$Q_a = P \times (1-R) = \rho c \times DT \times V, \text{ or } 3.1 J \text{ in } 4s, \text{ or about } 0.75 W.$$

ρ is the density and c is the specific heat.

The power of the laser P will have to take into account the reflectivity R of the material which will depend on its surface state, the wavelength of the laser, and the polarization of the laser beam. For example, if R=70%, a laser power of less than 3 W is required to realize the heat treatment of the part of example 1 according to the step e. and in the system according to the invention.

Example 2

According to the invention, it is desired to heat an aluminium part, held by support means, to 420° C. in 4 s, (starting from an ambient temperature of 20° C.), i.e. a temperature difference DT of 400° C. requiring a rise time of 100° C./s. The part is a rod of 2×2 mm cross-section and 6 mm length:

for the first 200° C., the losses by convection will be in the order of 5 to 15% of the heat input $Q_{in}$, the losses by radiation will be in the order of 1 to 2% of the heat input $Q_{in}$;

for the last 200° C., the losses by convection will be about 15 to 30% of the heat input $Q_{in}$, the losses by radiation will be about 5 to 10% of the heat input $Q_{in}$.

If we neglect these losses (comprising the losses with the support means by providing for example a heat insulation between the support means and the part, or by assuming that the support means are totally thermally insulating), the amount of energy to be provided $Q_a$ will then be:

$$Q_a = P \times (1-R) = \rho c * DT * V, i.e.\, 24J \text{ in } 4s, \text{ or } 6W.$$

The power of the laser will have to take into account the reflectivity R of the material which will depend on its surface state, the wavelength of the laser, and the polarization of the laser beam. For example, for R=70%, a laser power of less than 20 W is required to realize the heat treatment of the part of Example 2 according to the step e. and in the system according to the invention. Considering that the losses by convection and radiation in particular, would not be negligible and would require multiplying by 2, the necessary laser power $Q_a$, a laser power of 40 W would then be necessary, which is a relatively low (laser) power.

Power of current diode and fibre lasers:

The current lasers allow to have powers of the order of:

compact, air-cooled and inexpensive laser: 10 W to 400 W with a wall plug efficiency >40%;

more powerful water-cooled lasers are available up to 120 kW with wall plug efficiency >40%.

A wall plug efficiency of 40% means that 100 W of electrical power is converted into 40 W of laser power.

The power available for the core heat treatment (e.g. quenching) of small parts corresponds perfectly to the order of magnitude of the power required for the heat treatment (quenching) of at least one part. The use of much more powerful laser sources would allow to realize heat treatments (quenching for example) according to the method and the system of the invention in parallel on many parts. Thus, a compact lase 400 W would allow simultaneous realizing the quenching of a series of 50 to 100 parts of the example 1;

a more powerful laser 4 kW would allow to realize the simultaneous quenching of a series of 500 to 1000 parts of the example 1, or 50 to 100 parts of example 2.

Stabilization and Decrease of the Temperature

Once the desired temperature of the part for the heat treatment has been reached, if the laser is switched off according to the step f. of the method, then the energy input is zero. The part will then reject a quantity of energy (quantity of heat $Q_{out}$) by conduction, convection and radiation.

As explained above, the system and the method of the invention allow to optimize the losses by radiation since the external environment is only minimally affected by the localized heat input. The temperature difference between the part and the outside environment will then be optimal since the outside environment remains at room temperature (e.g. 20° C.). This loss by radiation will be important for the high temperatures due to the dependence on $T^4$.

For the losses by convection, they can be:

either minimized by working under partial vacuum or increased by increasing the convection coefficient by:

the input of a gas (air, neutral gas, or nitrogen) at room temperature;

the input of a gas (air, neutral gas, or nitrogen) cooled via an adiabatic expansion or by vortex;

the immersion of the part in a liquid (lowering into a bath (water, oil, glycol)).

For the losses by conduction, they can be:

either minimized by working on insulating support means (ceramic) and with a small contact surface (e.g. cylinder placed on a plate, plate on spikes)

or increased by increasing:

the contact surface (positioning allowing a superficial contact);

the conduction through a conductive interface.

If a gentle slope of temperature decrease (cooling rate) is required, an insulating installation (support means), a natural convection or under partial vacuum (in a vacuum chamber) are preferred.

If a greater slope is desired, the order of preference is:

the use of a gas flux at room temperature;

the use of a low temperature gas flux;

the contact of the part with a thermally conductive surface (heat exchanger).

If we want to reach a very important slope (for example for the hyper-quench), we will allow the immersion (partial immersion) of the part in a liquid.

All these phenomena can be combined and used successively according to the stages and passages from one phase to another (depending on the materials and of the initial structure of the part).

Example 3

A. After the temperature of the part has been raised by the laser (with power P1) according to the step e., losses by radiation and convection will lower the temperature of the part. If we want to keep an isothermal stage, it is proposed to counterbalance these losses by a limited laser power input P2 (P2<P1) to balance the thermal balance of the part.

B. After the temperature of the part has been raised by laser (Power P), according to the step e., under partial vacuum (to avoid the oxidation or the decarbonization), a cooled neutral gas is injected to increase the losses by convection.

C. After raising the temperature of the part by laser (Power P), according to the step e., under partial vacuum (to avoid the oxidation or the decarbonization), the part is lowered to bring it into contact with a thermally conductive surface (heat exchanger) which will facilitate the losses by conduction.

D. After the temperature of the part has been raised by laser (Power P), the part is immersed (immersed) by means of a jack in a liquid bath (molten salt, oil, etc.) to realize a hyper-quench. The cooling means used depends on the desired cooling rate and the geometry of the part. For example, a part with a large external surface in a same plane can be efficiently cooled by bringing it into contact with a thermally conductive surface (heat exchanger).

Control of the Energy Balance of the Part.

The laser power P is controlled very easily via its interface converting the electric current into light power P.

The gas input and the control of its pressure are realized via the control of a pneumatic island for example.

The lowering of a jack for the displacement of the part on a thermally conductive surface (heat exchanger) or in a bath (as will be described below in connection with the figures) is realized, for example, by transmitting an electrical signal to the control means of a pneumatic or electric jack.

A control of the temperature of the part can be realized:

via a temperature sensor placed on the support means. This generates a conductive connection with the part that will increase the loss by conduction and increase the temperature decrease slope;

via non-contact measuring means that will not disturb the heat treatment cycles (quenching): thermal camera, pyrometer.

BRIEF DESCRIPTION OF THE FIGURES

These and other aspects of the invention will be clarified in the detailed description of particular embodiments of the invention, reference being made to the drawings of the figures, wherein:

FIG. 2 shows another possible embodiment of the system according to the invention;

FIGS. 3a, 3b and 3c show different examples of parts that can be volume quenched with the method of the invention;

The drawings in the figures are not to scale. Generally, similar elements are denoted by similar references in the figures. The presence of reference numbers in the drawings shall not be considered limiting, even when such numbers are indicated in the claims.

DETAILED DESCRIPTION OF SOME EMBODIMENTS OF THE INVENTION

Figures 1A, 1B, 1C:
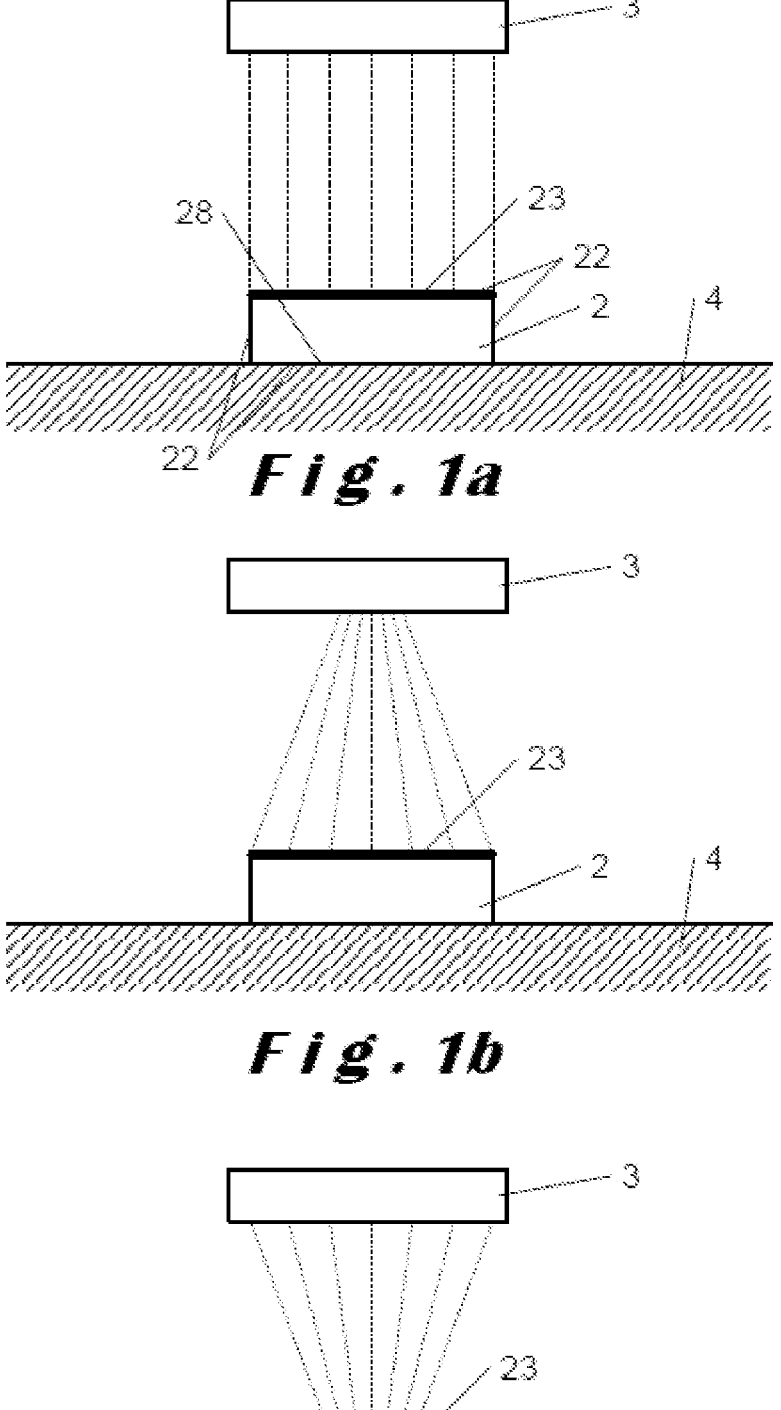
FIG. 1a shows an embodiment of the system according to the invention.
FIGS. 1b and 1c show other embodiments of the system according to the invention.

FIG. 1a shows an example of an embodiment of the system for the volume heat treatment of a part 2 according to the invention. Preferably, the heat treatment corresponds to a volume quenching. The system according to the invention comprises a laser source 3 which may be continuous or pulsed. Support means 4 allow to support the part 2, for example, to be quenched. In the example shown in FIG. 1a, these support means have a substantially flat upper surface to support and hold in position the part 2 to be quenched, whose lower face 28 is in contact with the support means 4.

Once the part 2 has been placed and held in position by the support means 4, the method of the invention consists of irradiating with the laser source 3 at least one segment 23 of the external surface 22 of the part 2. In the example of FIG. 1a, the laser source 3 emits a collimated light beam so as to limit the adjustments regarding the position of a focusing distance of the collimated light beam with respect to the external surface 22 of the part 2. In the example shown in FIG. 1b, the laser source 3 emits a divergent light beam so that it can irradiate a large segment 23 of the external surface 22 of the part 2. In the example shown in FIG. 1c, the laser source 3 emits a converging light beam so that the light beam can be directed onto a selected segment 23 of the external surface 22 of the part 2. This example in FIG. 1.c illustrates the use of a homogenized and focused light beam. This external surface 22 delimits the volume of the part 2 to be quenched. This irradiation by the laser source 3 can be direct or indirect. Thus, it is possible to insert one or more optical elements between the laser source 3 and the part 2, for example to deflect a laser beam produced by the laser source 3 and direct it towards the part 2. In the examples shown in FIGS. 1a, 1b, and 1c, the part 2 is irradiated from its upper surface only. As a result of this laser irradiation, the temperature of the part 2 will increase from the segment 23 of the surface illuminated by the laser source 3.

The support means 4 have a certain degree of heat insulation between them and the part 2 or equivalently a certain heat insulation capacity between them and the part 2. A degree of heat insulation can be defined by an ability to limit the heat exchange between the part 2 and the support means 4. It is possible to have such a technical effect in different ways. Thus, it is possible to use support means 4 having a low thermal conductivity limiting a thermal exchange by conduction following the contact between the part 2 and the support means 4. It is also possible to limit the contact surfaces areas between the part 2 and the support means 4. Limited contact surface areas between the part 2 and the support means 4 also allow to limit any heat exchange by conduction between the part 2 and the support means 4. For a same thermal conductivity of the support means 4, a heat exchange between the part 2 and the support means 4 will be lower when the contact surface (contact surface areas) between part 2 and support means 4 is smaller. For the invention, it is preferred to have support means 4 such that thermal energy (or heat) present at a location on the part 2 (for example on a point on its external surface 22) is more likely to diffuse into the part 2 rather than diffuse towards the support means 4.

When the part 2 is irradiated with the laser source 3, the heat generated at the level of the surface segment 23 illuminated by the laser source 3 tends to diffuse throughout the volume of the part 2. The inventors have noticed that it is possible to have a rise in temperature in the whole volume of the part 2 (and thus not only at the level of the illuminated segment 23) inducing a modification of the structure of the material constituting the part 2.

In the examples shown in FIGS. 1a, 1b, 1c, and assuming that the support means 4 limit any heat exchange between them and the part 2, the inventors have the following physical interpretation to explain this amazing phenomenon. The heat generated at the level of the irradiated segment 23 reaches the opposite lower surface 28 after a certain time. It is preferred to have a part 2 with a relatively small thickness (5 mm or less, for example between 2 and 1 mm) so that the heat arrives quickly at the lower surface 28: between 1 and 4 s. Once the heat reaches the lower surface 28, it will 'bounce back' due to the low heat transfer towards the support means 4. The only significant heat diffusion possible is therefore towards the core of the material, leading to an appreciable, if not completely homogeneous rise in temperature.

After this heating step, the invention preferably consists of stopping the laser irradiation used for heating. When it is a volume quenching method, it allows to freeze the material in a structure other than the one present before the heating. For some parts 2, for example small parts (i.e. with a volume of less than 1 $cm^3$), forced cooling is not necessary to freeze the part 2 in this new material structure. This provides a huge advantage over known volume quenching methods where the use of a fluid is often required to cool the part 2 and freeze it in a new crystallographic structure.

The inventors have noticed, surprisingly, that it is not necessary to have very powerful laser sources 3 to realize a volume quenching of parts 2 using the method of the invention. Thus, it is possible to have volume quenching with continuous laser sources 3 having powers of the order of or less than 50 W, for example 20W or 6 W. This is especially true when the part 2 has a small volume, i.e. less than 1 $cm^3$. We can then obtain temperature rises of the order of 3000 K on the irradiated segment 23.

FIG. 2 shows another embodiment of the invention in which the part 2 is irradiated by two laser sources so as to have a larger irradiated segment 23 of the part 2 than with one laser source. This is advantageous in order to achieve a temperature rise in the entire volume of the part as quickly as possible. This embodiment is particularly advantageous for thick parts 2 and/or parts with complex geometries in order to have heat inputs distributed around the part 2. This embodiment can be implemented indifferently from embodiments comprising different examples of support means 4. With the embodiment of FIG. 2, for a same part 2, the heat generated at the level of the irradiated segment 23 reaches the opposite lower surface 28 after a shorter time than with the embodiment of FIG. 1. This embodiment of FIG. 2 can be implemented indifferently from the embodiments of FIGS. 1a, 1b and 1c.

FIGS. 3a-c show different examples of parts 2 that can be volume quenched with the method of the invention. FIGS. 3a-c illustrate the core 27 of parts 2 of different geometries. The core is often located in the volume of the part 2 at a position equidistant from the external surface 22. The method of the invention allows for the quenching of the entire volume of the part 2 comprising the quenching of the core 27 of the part 2.

Figures 4A, 4B, 5A, 5B:
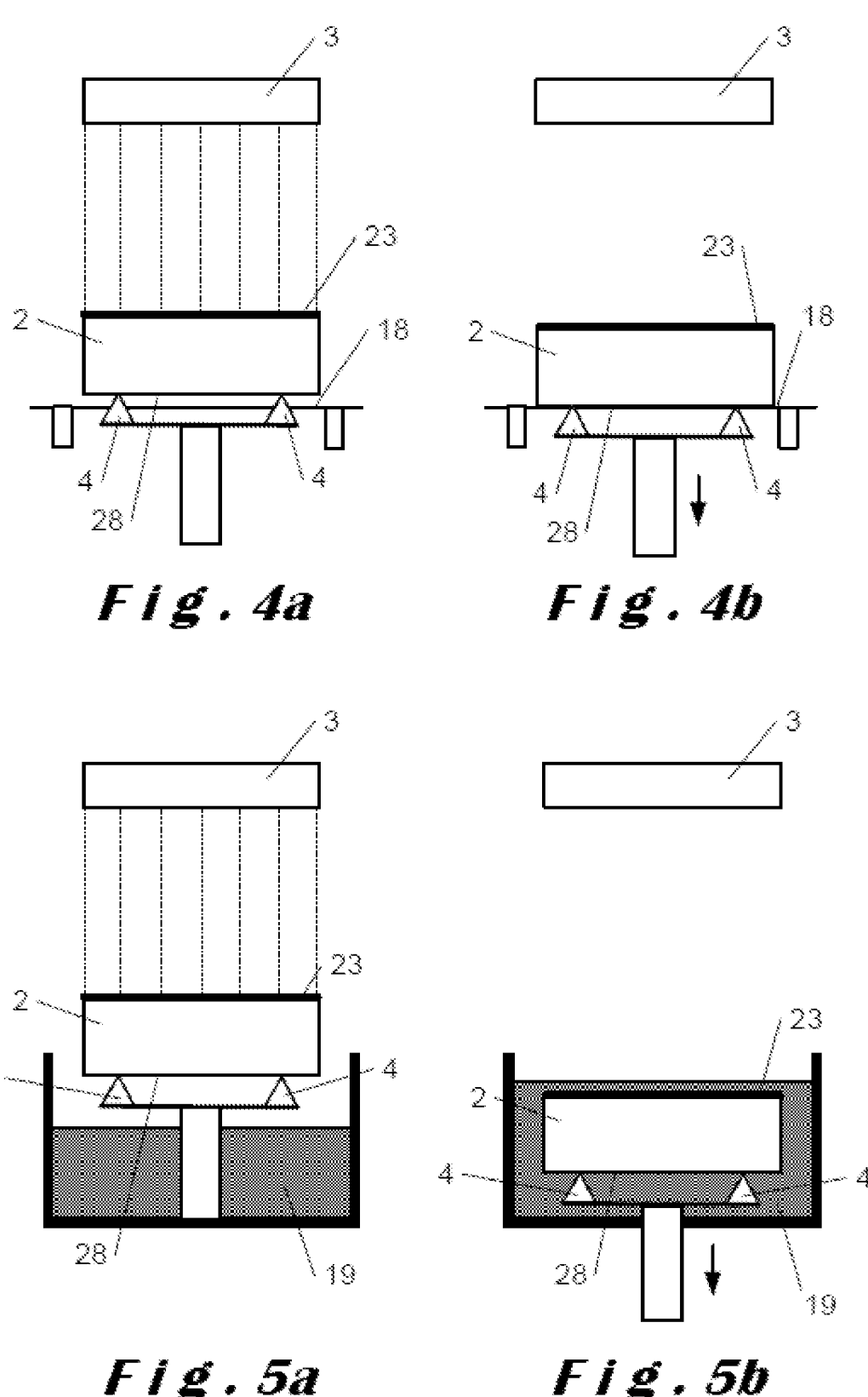
FIGS. 4a, 4b show another possible embodiment of the method and system according to the invention.
FIGS. 5a, 5b show another possible embodiment of the method and system according to the invention.

FIGS. 4a and 4b illustrate a particular embodiment of the invention. The support means 4 are here shaped like spikes so as to minimize the contact surface between them and the part 2. As can be seen in FIG. 5a, for this particular embodiment the inventors further propose a heat exchanger 18 positioned at a distance from the external surface 22 (preferably the opposite lower surface 28) of the part 2. At the end of the step e. of the method of the invention, a cooling of the part 2 is initiated (e.g., during the step f. for the embodiments comprising such a step). In FIG. 4b, according to this particular embodiment of the invention, the laser radiation is stopped. Almost simultaneously, the part 2 is brought into physical contact with the heat exchanger 18 by means of its opposite lower surface 28. This results in accelerated cooling of the part 2 due to the significant increase in the conductive heat exchange between the part 2 and the heat exchanger 18. The contacting can be slightly delayed compared to the beginning of the cooling phase, for example compared to the beginning of the step f, in order to wait for a certain amount of heat to be emitted by radiation from the part 2 towards the external environment. In such a configuration, the contact of the part 2 with the heat exchanger 18 then allows an optimization of the heat exchanges from the part towards the external environment when the losses by radiation are less important. Preferably, the heat exchanger 18 has a higher thermal conductivity (well) than the support means 4. As can be seen in FIGS. 4a and 4b, the heat exchanger 18 is preferably adapted to undergo a relative movement with respect to the part 2. For this purpose, it can for example be mounted on an electric or pneumatic jack which allows it to describe a relative movement with respect to the part 2.

FIGS. 5a and 5b illustrate another particular embodiment of the invention. The support means 4 are also shaped like spikes so as to minimize the contact surface between the part 2 and the support means 4 and thus reduce a conductive heat transfer between them and the part 2. In this particular embodiment, the inventors propose to use a liquid bath 19 whose upper surface is positioned at a distance from the external surface 22 (preferably the opposite lower surface 28) of the part 2. At the end of the step e. of the method of the invention, a cooling is initiated (and for example the step f. for the embodiments comprising such a step). This corresponds to FIG. 5b where we see that the laser source 3 has been turned off. Almost simultaneously, the part 2 is immersed (partially or completely) in the liquid bath 19. Its external surface 22 is then in contact with the liquid bath 19. This results in an accelerated cooling of the part 2 due to the significant increase in the heat exchange by conduction and/or convection between the part 2 and the liquid bath 19. The immersion may be slightly delayed from the end of the step e. and from the beginning of the step f. for embodiments comprising such a step, in order to wait for a maximum amount of heat to be radiated from the part 2 towards the external environment. When the radiation losses are less significant, then immersing the part 2 in the liquid bath 19 further allows to cool the part 2 by convection losses between the part 2 and the liquid bath 19. To allow the immersion of the part 2 in the liquid bath 19, the inventors propose, for example, to mount the support means 4 supporting the part 2 on an electric or pneumatic jack. This allows to impose a vertical movement of the part 2 and thus its immersion in the liquid bath 19.

Figure 6A:
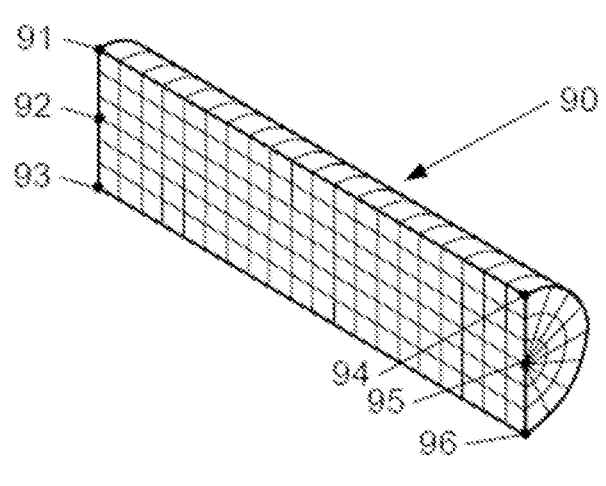
FIGS. 6a, 6b, and 6c illustrate a temperature simulation during the realization of a method according to the invention.
Figure 6B:
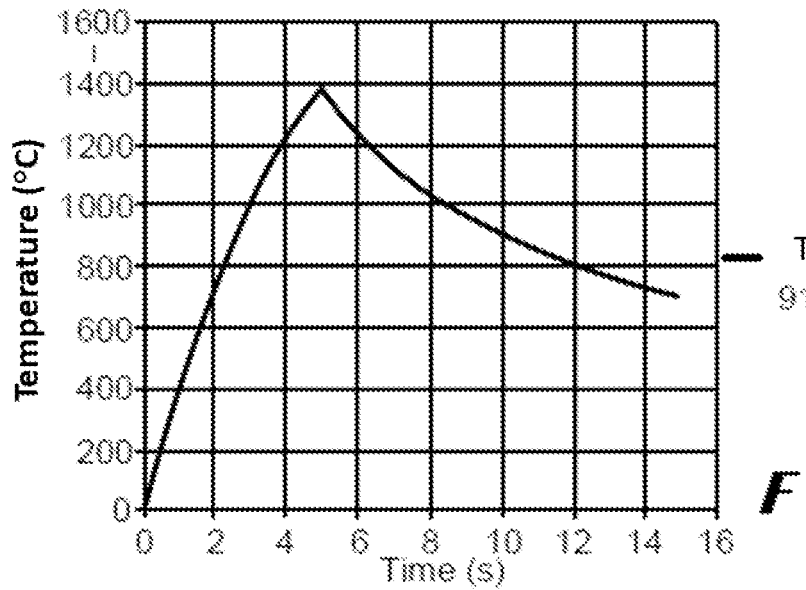
Figure 6C:
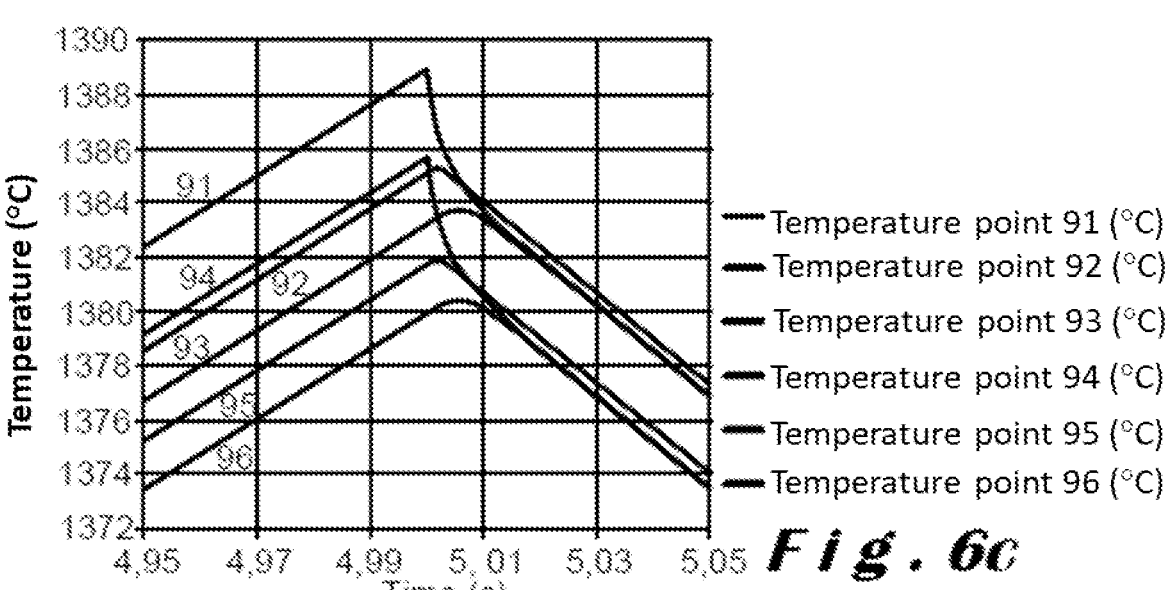

FIGS. 6a, 6b, and 6c show the results of a finite-element simulation. FIG. 6a shows one half of a longitudinal cross-section segment of a 1 $mm^3$ steel cylinder 90 with an axial length of 4 mm and a cross-sectional area of 0.6 mm in diameter. The points 91, 92, 93 represent the centre of the cylinder 90. The points 91 and 93 are located on the external face of the part, the point 92 is located in the core of the part, at equidistance between the points 91 and 93. The points 94, 95, 96 represent a lateral face of the cylinder 90. The points 94 and 96 are located on the external face of the part, the point 95 is located in the centre of the lateral face of the part, at equidistance between the points 94 and 96. The following assumptions are used for the simulation, the results of which are shown in FIGS. 6b and 6c:

laser power received on the upper portion between the points 1 and 4=0.7 W (electrical power: 1,8 W);

reflectivity R: 70%;

irradiation for 5 s;

k and c are functions of the temperature of the part;

cooling:

by radiation with F (emissivity) constant=0.25, by natural convection with h (thermal transfer coefficient generally expressed in $W \cdot m^{-2} \cdot K^{-1}$) constant=10.

power consumption (Pa) by the part: 0.2 W.

FIG. 6b illustrates the evolution of the temperature versus the time for each of the points 91 to 96 in the simulated part. With the scale of FIG. 6b, the different curves are superimposed: thus, we deduce an absence of significant temperature gradient between the different points: the evolution of the temperature in each of the points 91 to 96 is approximately the same. FIG. 6c shows a zoom at the moment when the laser irradiation is terminated. At a given moment, thermal gradients between the different points are observed, not exceeding 10° C. The laser beam irradiation is centred on the point 91, along the direction 91-93. This illustrates that the method of the invention is very well adapted to the heat treatment (e.g. quenching) of parts (metallic) with volumes in the cm³ range.

Figures 7, 8A, 8B, 8C:
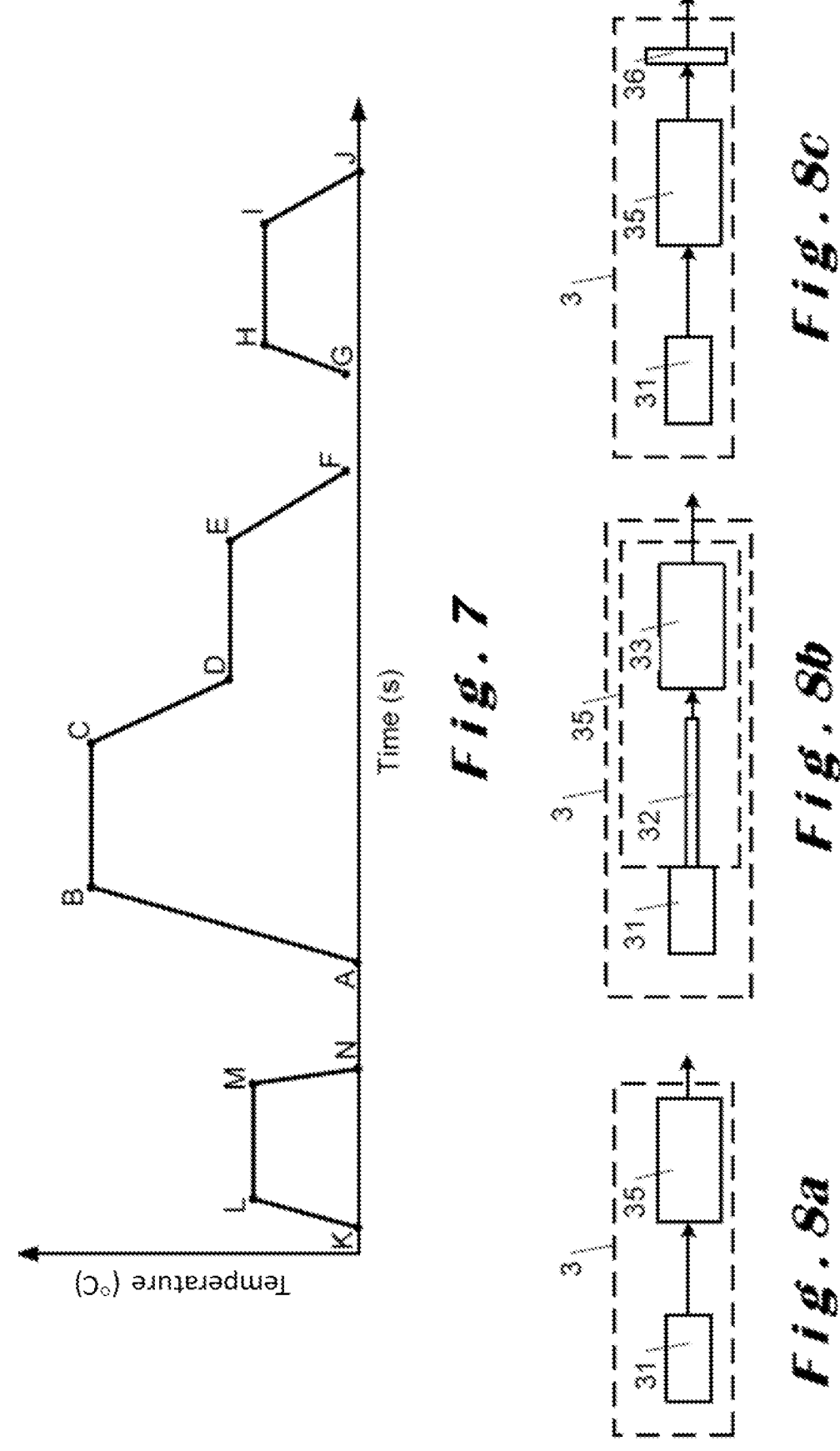
FIG. 7 shows an example of a thermal cycle that can be realized partly or in its entirety by the method or system according to the invention.
FIGS. 8a, 8b and 8c show preferred embodiments of a laser source according to the invention.

FIG. 7 shows a thermal cycle that can be implemented partly or in its entirety by the method according to the invention. Such a thermal cycle shows:

temperature rises with a defined slope via the control of the power of the laser, illustrated by the segments: AB, GH and KL;

stabilizations of the temperature by controlling losses (by radiation and/or convection and/or conduction) and providing a residual laser power to counterbalance them, illustrated by the segments BC, DE, FG, HI and LM;

temperature decreases by optimizing the heat losses of the part towards the outside environment, illustrated by the segments CD, EF, IJ, MN. Preferably, the laser source 3 is switched off during these temperature decreases or cool-downs.

The temperature rises and decreases can be:

very soft: conductive insulation, natural convection or maintenance in partial vacuum and if necessary very soft laser power, soft: natural to forced convection (gas at room temperature), fast: forced convection (with cooled gas), conductive connection, very fast: displacement in a liquid solution (molten salts, oil, glycol) at a given temperature; high laser power for a rapid heating.

The segment of the thermal cycle KLMN is often associated with an annealing. The segment of the thermal cycle ABCDEF is often associated with a quenching. For a quenching without isothermal stage DE, the point D is at a temperature close to the temperature of the point A and the points E and F are omitted. The segment of the thermal cycle GHIJ is often associated with a tempering.

Experimental Example

In this experimental example, a quenching method according to the invention was implemented with a continuous laser source 3 with an output laser beam power of 0.7 W directed towards an external surface segment 22 of a steel part 2. The part is held by support means. At t=0 s, the part is at room temperature (20° C.); according to the step e., after 2 s of irradiation with a laser power of 0.7 W, the part reaches a temperature of 750° C., after 3 s the temperature is 950° C., between 4 s and 5 s the temperature of the part reaches 1300° C., which corresponds to a target temperature for the desired heat treatment. The laser source 3 is then switched off. After 6 s the temperature in the part drops to 800° C., after 7 s the temperature is 575° C. A metallurgical study of the part reveals a metallurgical transformation of the part and an increase in hardness to about 800 HV (unit of the Vickers hardness). The conclusion of this experimental test reveals that only 0.2 W of laser power absorbed by a volume of 1 mm³ during 5 s leads to the exceeding of the melting temperature (1300° C.), no temperature gradient in different places of the part was observed. The temperature decrease shows a speed higher than 400° C./s until reaching a temperature of the part 2 of about 800° C., then a slowdown to about 200° C./s.

A comparison of the experimental results and of the model shows that the temperature rise is consistent with the model/simulation shown in FIGS. 6a, 6b, 6c and explained above. However, the heat loss of the part 2 towards the outside environment is underestimated because the temperature drops are much faster than the model/simulation. The differences between simulations and this experimental result can be explained at least partly by the following limitations:

the coefficient h=10 is only valid for natural convection ($\Delta T < 100°$ c.). The $\Delta T \gg 100°$ c. increase considerably h, the losses by interstitial conduction (ceramic/steel) are not taken into account in the simulation, the coefficient $\varepsilon$ is considered constant with the temperature in the case of the present simulation, which is not the case in reality but represents a reasonable approximation.

FIGS. 8a, 8b and 8c show preferred embodiments of a laser source 3 of the invention. The example embodiment in FIG. 8a shows a laser source 3 comprising a laser beam generator 31 and beam control means 35 configured to modulate the intensity profile of the laser beam emitted by the laser beam generator 31.

The example of the embodiment in FIG. 8b shows a laser source 3 comprising a laser beam generator 31 and beam control means 35 configured to modulate the intensity profile of the laser beam emitted by the laser beam generator 31. The beam control means 35 comprises a multimode optical fibre 32, and a laser beam projection device 33. The multimode optical fibre 32 comprises an input and an output. The multimode optical fibre 32 is configured to convey a laser beam emitted by the laser beam generator 31 from the input of the multimode optical fibre 32 to its output. The multimode optical fibre 32 has a predetermined cross-section that is constant between its input and output. The laser beam projection device 33 is configured to project onto the part 2, an image of the output of said multimode optical fibre 32, and therefore, an image of the laser beam conveyed by the multimode optical fibre 32 whose outline is defined by the output cross-section of the multimode optical fibre 32. The example embodiment in FIG. 8c shows a laser source 3 comprising a laser beam generator 31, beam control means 35 configured to modulate the intensity profile of the laser beam emitted by the laser beam generator 31, and focusing means 36.

Figure 9:
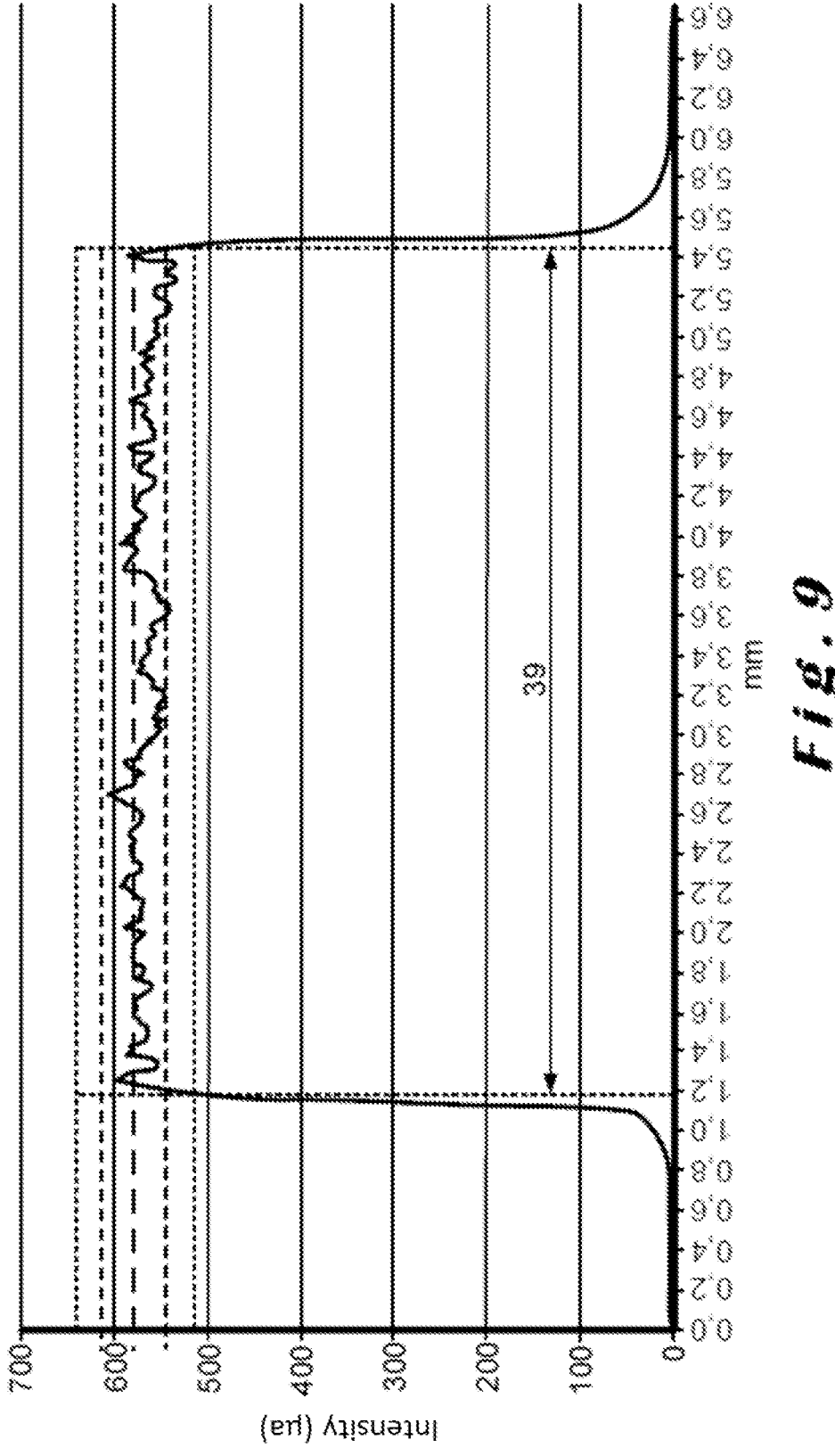
FIG. 9 shows an intensity profile of the laser beam projected onto a part according to a preferred embodiment of the invention.

FIG. 9 shows a graph representing an intensity distribution of a laser beam conveyed by the multimode optical fibre 32 and projected by the laser beam projection device 33 onto an external surface 22 of the part 2 that is planar and perpendicular to the main direction of propagation of the collimated light beam. This graph represents an intensity distribution at the level of the diameter 39 of the image of the laser beam on the part 2. Here, the diameter 39 of the image of the laser beam on the part 2 is approximately 5 mm. The image of the laser beam shows a uniform irradiation over almost the entire irradiated surface 23 of the part 2.

Figures 10A, 10B:
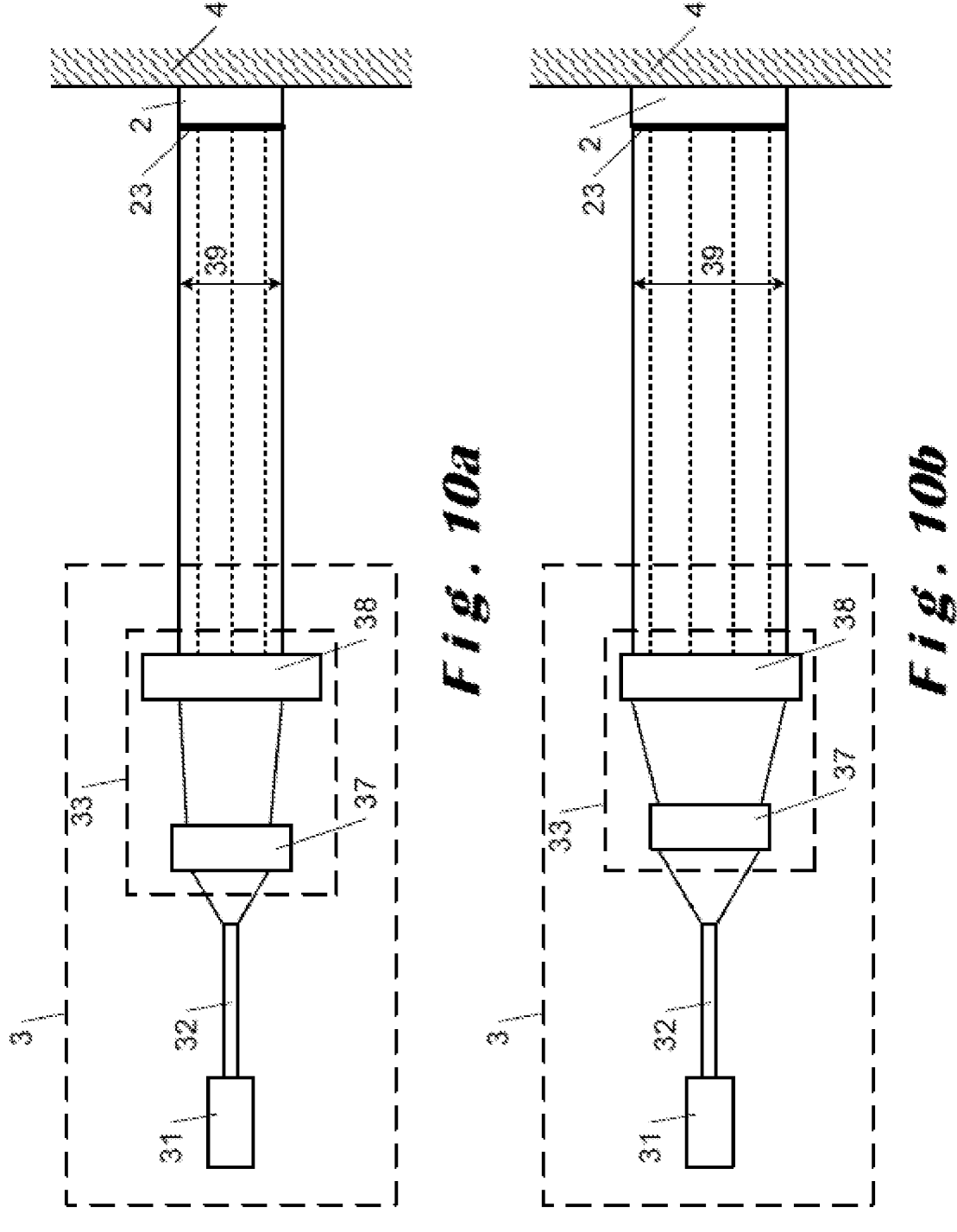
FIGS. 10a and 10b represent preferred embodiments of the system according to the invention.

FIG. 10a shows a preferred embodiment of the system for the volume heat treatment of a part 2 comprising the laser source 3 shown in FIG. 8. The laser source 3 shown in FIG. 8 comprises a laser beam generator 31, a multimode optical fibre 32, and a laser beam projection device 33, wherein the laser beam projection device 33 comprises a first converging optical element 37 and a second converging optical element

38. The first 37 and the second 38 converging optical elements are preferably converging lenses, more preferably convex plane type lenses. Even more preferably, the convex face of the first convex plane converging lens 37 faces the convex face of the second convex plane converging lens 38. The laser beam projection device 33 allows to form an image having a diameter 39 on the part 2 supported by the support means 4. The diameter 39 is defined by the configuration of the laser beam projection device 33 (power of the lenses 37, 38 and their relative positions to each other and to the output of the multimode optical fibre 32) and by the cross-section of the multimode optical fibre 32 (at its output). When the output of the multimode optical fibre 32 is imaged by the laser beam projection device 33, and the laser beam generator 31 emits a laser beam that is conveyed by the multimode optical fibre 32, then the image of the output of the multimode optical fibre corresponds to a light spot with a diameter 39.

FIG. 10b shows the embodiment of FIG. 10a for a larger part 2 for which it is necessary to increase the diameter 39 of the output image of the multimode optical fibre 32 on the part 2 in order to be able to realize a heat treatment with the smallest possible surface thermal gradients 22 on the part 2. The laser beam projection device 33 allows such a diameter 39 of the image of the output of multimode optical fibre 32 on the part 2 to be modulated by changing the relative position of the first converging lens 37 with respect to the output of the multimode optical fibre 32 and/or the position of the second converging lens 38 with respect to the first converging lens 37. Such a modulation allows to obtain magnifications allowing an adaptation to parts having sizes which can vary strongly. Preferably, the first converging lens 37 is positionally controlled between the output of the multimode optical fibre 32 and the second converging lens 38 so as to adjust the size of the laser beam on the part 2.

The temperature increase of a part in the step e. is realized by a single step of irradiation of the part, which has the advantage of offering a homogeneous heat treatment of the part. In particular, with the invention, it is not necessary to provide a significant displacement between the laser source (heating source) and the part to be treated. It is possible to imagine a small relative movement between the part to be treated and the laser source (such as oscillation around a reference position), but it is not necessary to foresee a translational displacement of several tens of mm or more between the laser source and the part to be treated. The present invention is in particular applicable to parts which have a longest dimension of less than 10 mm, preferably 8 mm or less.

The present invention has been described above in connection with specific embodiments, which are illustrative and should not be considered limiting. In general, the present invention is not limited to the examples illustrated and/or described above. The use of the verbs "comprise", "include", or any other variant, as well as their conjugations, can in no way exclude the presence of elements other than those mentioned. The use of the indefinite article "a", "an", or the definite article "the", to introduce an element does not exclude the presence of a plurality of these elements. The reference numbers in the claims do not limit their scope.

In summary, the invention can also be described as follows.

Method for volume heat treating a part 2 having an external surface 22 delimiting its volume, the method comprising the following steps:

a. providing a laser source 3;

b. providing the part 2;

c. providing support means 4 to support the part 2;

d. placing said part 2 so that it is held in position by said support means 4;

e. irradiating with said laser source 3 at least one segment 23 of the external surface 22 of said part 2 with a laser power and exposure duration to obtain a temperature rise in essentially the entire volume of the part 2.

Preferably, the support means 4 for supporting the part 2 has a degree of heat insulation between it and said part 2.

The invention can also be described as follows.

A system for volume heat treatment of a part having an external surface delimiting its volume, the system comprising:

a laser source configured to irradiate at least one segment of the external surface of the part with a power and a duration of laser exposure to obtain a temperature rise in essentially the entire volume of the part to induce a structural modification of the material constituting the part;

support means for supporting the part.

Preferably, the support means have a degree of heat insulation between them and the part.

What is claimed is:

1. A method for volume heat treating a part having an external surface delimiting its volume, the method comprising the following steps:

a. providing a laser source;

b. providing the part, the part consists of a material having a thermal conductivity greater than 10 $W \cdot m^{-1} \cdot {}^{\circ} C.^{-1}$ and the volume of the part is between 0.01 mm$^3$ and 5 cm$^3$;

c. providing a support mechanism for supporting the part;

d. placing said part so that it is held in position by the support mechanism; and e. volume heat treating the part by irradiating with the laser source at least one segment of the external surface of the part with a laser exposure power and duration to obtain a temperature rise in essentially the entire volume of the part, the temperature rise of the part (2) is realized by a single step of irradiation of the part (2) and the irradiation being adapted to impose a homogeneous temperature in the entire volume of the part (22).

2. The method according to claim 1, further comprising, after the step e., the following step:

f. stopping the irradiation of the step e. to cool the part.

3. The method according to claim 2, the method being a method for volume quenching the part, in that the step e. allows to induce a structural change in the material constituting the part, and in that the step f. is adapted to freeze the material constituting the part in a structure different from the one it had before the irradiation in the step e.

4. The method according to claim 1, wherein the laser source is configured to emit a collimated light beam, and to irradiate in the step e. the at least one segment of the external surface of said part with the collimated light beam.

5. The method according to claim 2, wherein the step f. further comprises an action of directing a fluid in the direction of the part to cool it by convection.

6. The method according to claim 1, wherein the support mechanism have a flat support surface for supporting the part.

7. The method according to claim 1, wherein the support mechanism comprise a refractory material.

8. The method according to claim 1, wherein the support mechanism comprise a material having a thermal conductivity less than 20 W·m$^{-1\cdot\circ}$ C.$^{-1}$.

9. The method according to claim 1, wherein there is a contact surface between the part and the support mechanism, the contact surface having a surface area of less than 10% of the surface area of the external surface.

10. The method according to claim 1, wherein the part consists of a material having a thermal conductivity greater than 35 W·m$^{-1\cdot\circ}$ C.$^{-1}$ the volume of the part is between 0.1 mm$^3$ and 500 mm$^3$;

or between 1 mm$^3$ and 100 mm$^3$; and the part has a specific surface of between 0.01 mm$^{-1}$ and 150 mm$^{-1}$.

11. The method according to claim 1, wherein:

the external surface consists of a first and a second segments of the external surface, and in that the step e. is to irradiate only the first segment of the external surface with a laser power and exposure duration to have a substantially equal temperature between the first and second segments of the external surface.

12. The method according to claim 1, wherein:

the external surface comprises a first and a second segments of the external surface, and in that the step e. consists of irradiating the first and second segments of the external surface.

13. A method for volume heat treating a part having an external surface delimiting its volume, comprising the following steps:

a. providing a laser source;

b. providing the part;

c. providing support mechanism for supporting the part;

d. placing said part so that it is held in position by the support mechanism;

e. irradiating with the laser source at least one segment of the external surface of the part with an annealing laser exposure power;

f. cooling the part after heating it to an annealing temperature in the previous step to a temperature less than 100° C.;

g. irradiating with the laser source at least one segment of the external surface of the part with an annealing laser exposure power that is less than the laser exposure power used in the step e.; and h. cooling the part after heating it to an annealing temperature in the previous step to a temperature less than 100° C.

14. A method for volume heat treating a part having an external surface delimiting its volume, comprising the following steps:

a. providing a laser source;

b. providing the part;

c. providing support mechanism for supporting the part;

d. placing said part so that it is held in position by the support mechanism;

e. irradiating with the laser source at least one segment of the external surface of the part with a laser exposure power and duration to obtain a temperature rise in essentially the entire volume of the part;

f. stopping the irradiation of the step e. to cool the part; and g. irradiating with the laser source at least one segment of the external surface of the part with a tempering laser exposure power which is less than the laser exposure power used in the step e. for the quenching.

15. The method according to claim 1, wherein the support mechanism has a degree of heat insulation between them and the part.

16. The method according to claim 1, wherein the support mechanism comprises a material having a thermal conductivity less than 5 W·m$^{-1\cdot\circ}$ C.$^{-1}$.

17. The method according to claim 1, wherein there is a contact surface between the part and the support mechanism, the contact surface having a surface area of less than 1% of the surface area of the external surface.

18. The method according to claim 1, wherein the part consists of a material having a thermal conductivity greater than 50 W·m$^{-1\circ}$ C.$^{-1}$;

the volume of the part is between 1 mm$^3$ and 100 mm$^3$; and the part has a specific surface of between 0.1 mm$^{-1}$ and 100 mm$^{-1}$.

* * * * *